(12) United States Patent
Stanard et al.

(10) Patent No.: US 10,692,270 B2
(45) Date of Patent: Jun. 23, 2020

(54) NON-DIVERGENT PARALLEL TRAVERSAL OF A BOUNDING VOLUME HIERARCHY

(71) Applicant: Microsoft Technology Licensing, LLC, Redmond, WA (US)

(72) Inventors: James D. Stanard, Kirkland, WA (US); Ivan Nevraev, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 72 days.

(21) Appl. No.: 15/862,521

(22) Filed: Jan. 4, 2018

(65) Prior Publication Data

US 2019/0057539 A1    Feb. 21, 2019

Related U.S. Application Data

(60) Provisional application No. 62/547,679, filed on Aug. 18, 2017.

(51) Int. Cl.
| | |
|---|---|
| *G06T 15/06* | (2011.01) |
| *G06T 1/20* | (2006.01) |
| *G06T 17/00* | (2006.01) |

(52) U.S. Cl.
CPC .............. *G06T 15/06* (2013.01); *G06T 1/20* (2013.01); *G06T 17/005* (2013.01); *G06T 2210/12* (2013.01)

(58) Field of Classification Search
CPC .................................................. G06T 15/06
See application file for complete search history.

(56) References Cited

U.S. PATENT DOCUMENTS

| | | |
|---|---|---|
| 8,072,454 B1 | 12/2011 | Aila et al. |
| 8,212,816 B1 | 7/2012 | Hoberock et al. |
| 2006/0256112 A1 | 11/2006 | Heirich et al. |
| 2013/0016109 A1* | 1/2013 | Garanzha ............... G06T 15/06 345/501 |

(Continued)

OTHER PUBLICATIONS

Afra et al., "Stackless Multi-BVH Traversal for CPU, MIC and GPU Ray Tracing," *Computer Graphics Forum*, 11 pp. (2013).

(Continued)

*Primary Examiner* — Phi Hoang
(74) *Attorney, Agent, or Firm* — Klarquist Sparkman, LLP

(57) ABSTRACT

Various approaches to performing non-divergent parallel traversal operations for a bounding volume hierarchy ("BVH") during ray tracing are presented. For example, a computer system has a processing unit with threads that, collectively, perform ray tracing for a group of rays in parallel in a computer-represented environment, which includes geometric objects (such as triangles) enclosed in the BVH. Each of the threads receives parameters for a given ray and traverses the BVH to determine an intersection, if any, between the given ray and one of the geometric objects. The order of traversal of the BVH is synchronized between threads for the rays of the group, for example, using a cross-group operation such as a ballot operation. In this way, the overall speed of the BVH traversal can be improved in many cases, while avoiding code divergence and data divergence in extra-wide single-instruction, multiple data ("SIMD") graphics processing unit ("GPU") architectures.

29 Claims, 14 Drawing Sheets

(56) References Cited

U.S. PATENT DOCUMENTS

| | | | | |
|---|---|---|---|---|
| 2013/0060540 | A1* | 3/2013 | Frahm | G06T 17/05 703/2 |
| 2014/0028687 | A1* | 1/2014 | Binder | G06T 1/00 345/501 |
| 2014/0168228 | A1 | 6/2014 | Luebke et al. | |
| 2016/0012633 | A1* | 1/2016 | Wei | G06T 17/05 345/420 |

OTHER PUBLICATIONS

Aila et al., "Understanding the Efficiency of Ray Traversal on GPUs," *Proceedings of High-Performance Graphics 2009*, 5 pp. (2009).

Gunther et al., "Realtime Ray Tracing on GPU with BVH-based Packet Traversal," *IEEE Eurographics Symposium on Interactive Ray Tracing 2007*, 6 pp. (2007).

Hapala et al., "Efficient Stack-less BVH Traversal for Ray Tracing," *SCCG 2001 Conference Proceedings*, pp. 29-34 (2011).

Karras, "Thinking Parallel, Part II: Tree Traversal on the GPU," downloaded from the World Wide Web, 13 pp. (2012).

Laine, "Restart Trail for Stackless BVH Traversal," *High Performance Graphics*, 5 pp. (2010).

Lohr, "GPU-based Parallel Stackless BVH Traversal for Animated Distributed Ray Tracing," 6 pp. (2010).

Wikipedia, "Bounding Volume Hierarchy," 4 pp. (downloaded from the World Wide Web on Jan. 4, 2018).

Wikipedia, "Ray Tracing (Graphics)," 11 pp. (downloaded from the World Wide Web on Jan. 4, 2018).

International Search Report and Written Opinion dated Jan. 22, 2019, from International Patent Application No. PCT/US2018/038382, 20 pp.

* cited by examiner software 180 implementing one or more innovations for non-divergent parallel traversal of a bounding volume hierarchy

FIG. 6b  traversal (601) of BVH 600 without prioritized scheduling of nodes

<u>action</u>

- evaluate node 0 (load BV for node 0; test BV for node 0; continue evaluation; schedule nodes 1, 8)
- follow branch a
- evaluate node 8 (load BV for node 8; test BV for node 8; continue evaluation; schedule nodes 9, 12)
- follow branch b
- evaluate node 12 (load BV for node 12; test BV for node 12; continue evaluation; schedule nodes 13, 14)
- follow branch c
- evaluate node 14 (load BV for node 14; test BV for node 14; continue evaluation; test for intersections)
- follow branch d
- evaluate node 13 (load BV for node 13; test BV for node 13; continue evaluation; test for intersections)
- follow branch e
- evaluate node 9 (load BV for node 9; test BV for node 9; continue evaluation; schedule nodes 10, 11)
- follow branch f
- evaluate node 11 (load BV for node 11; test BV for node 11; continue evaluation; test for intersections)
- follow branch g
- evaluate node 10 (load BV for node 10; test BV for node 10; continue evaluation; test for intersections)
- follow branch h
- evaluate node 1 (load BV for node 1; test BV for node 1; continue evaluation; schedule nodes 2, 5)
- follow branch i
- evaluate node 5 (load BV for node 5; test BV for node 5; continue evaluation; schedule nodes 6, 7)
- follow branch j
- evaluate node 7 (load BV for node 7; test BV for node 7; continue evaluation; test for intersections)
- follow branch k
- evaluate node 6 (load BV for node 6; test BV for node 6; continue evaluation; test for intersections)
- follow branch l
- evaluate node 2 (load BV for node 2; test BV for node 2; do not continue evaluation of node 2 – BV for node 2 includes no candidate triangle close enough to yield a closer intersection for any of the 64 rays)
- stop traversal of BVH – last scheduled node has been evaluated

FIG. 6c traversal (602) of BVH 600 with prioritized scheduling of nodes

<u>action</u>

- evaluate node 0 (load BV for node 0; test BV for node 0; continue evaluation; schedule nodes 8, 1 – prioritize node 1 as being better according to ray sign decision info)
- follow branch h
- evaluate node 1 (load BV for node 1; test BV for node 1; continue evaluation; schedule nodes 2, 5 – prioritize node 5 as being better according to ray sign decision info)
- follow branch i
- evaluate node 5 (load BV for node 5; test BV for node 5; continue evaluation; schedule nodes 6, 7 – prioritize node 7 as being better according to ray sign decision info)
- follow branch j
- evaluate node 7 (load BV for node 7; test BV for node 7; continue evaluation; test for intersections)
- follow branch k
- evaluate node 6 (load BV for node 6; test BV for node 6; continue evaluation; test for intersections)
- follow branch l
- evaluate node 2 (load BV for node 2; test BV for node 2; do not continue evaluation of node 2 – BV for node 2 includes no candidate triangle close enough to yield a closer intersection for any of the 64 rays)
- follow branch a
- evaluate node 8 (load BV for node 8; test BV for node 8; do not continue evaluation of node 8 – BV for node 8 includes no candidate triangle close enough to yield a closer intersection for any of the 64 rays)
- stop traversal of BVH – last scheduled node has been evaluated

FIG. 7a
701

```
void Traverse(
    inout float resultT,
    out float2 resultBary,
    out uint resultTriId,
    float3 rayOrigin,
    float3 rayDirection,
    float3 rayInverseDirection,
    float3 rayOriginTimesRayInverseDirection,
    uint GI)
{
#if UNIFORM_TRAVERSAL_MODE == 1
    uint3 raySign = MajorityVote(rayDirection > 0.0) ? uint3(1, 2, 4) << 24 : 0;
#else
    uint3 raySign = rayDirection > 0.0 ? uint3(1, 2, 4) << 24 : 0;
#endif
    uint signBits = raySign.x | raySign.y | raySign.z;

uint stackPointer = 0;
    StackPush(stackPointer, 0, GI);

do
    {
        uint thisNodeIndex = StackPop(stackPointer, GI);

uint flags;
        BBox box = BVHReadBoundingBox(thisNodeIndex, flags);

bool test = RayBoxTest(resultT,
            rayOriginTimesRayInverseDirection,
            rayInverseDirection,
            box.center,
            box.halfDim);
``` continued in FIG. 7b

FIG. 7b    702 continued from FIG. 7a

```
#if UNIFORM_TRAVERSAL_MODE == 1
        if (any(_Ballot64(test)))
#else
        if (test)
#endif
        {
            // Leaf flag tells us whether to read the node index
            if (flags & 0x80000000) // isLeaf
            {
                // leaf processing
                TestLeafNodeIntersections(flags,
                    rayOrigin,
                    rayDirection,
                    resultBary,
                    resultT,
                    resultTriId);
            }
            else
            {
                // box testing -- left index comes with the bounding box
                const uint leftChildIndex = flags & 0x00ffffff;
                const uint rightChildIndex = thisNodeIndex + 1;
                const bool traverseRightFirst = (signBits & flags) != 0;

StackPush2(stackPointer, traverseRightFirst, rightChildIndex,
leftChildIndex, GI);
            }
        }

//
        // Continue iteration until all lanes are marked dead. The stack is still there.
        //
    } while (stackPointer > 0);
}
```

FIG. 7c    703

```
#if UNIFORM_TRAVERSAL_MODE == 1
// Returns true for the majority vote.  This is uniform.
bool MajorityVote(bool vote)
{
    uint2 tally = _Ballot64(vote);
    return countbits(tally.x) + countbits(tally.y) > 32;
}

// Returns three popular votes
bool3 MajorityVote(bool3 vote)
{
    return bool3(MajorityVote(vote.x), MajorityVote(vote.y), MajorityVote(vote.z));
}
#endif
```

FIG. 7d    704

```
groupshared uint stack[TRAVERSAL_MAX_STACK_DEPTH];

void StackPush(inout int stackTop, uint value, uint tidInWave)
{
    stack[stackTop] = value;
    stackTop++;
} void StackPush2(inout int stackTop, bool selector, uint valueA, uint valueB, uint
tidInWave)
{
    const uint store0 = selector ? valueA : valueB;
    const uint store1 = selector ? valueB : valueA;

stack[stackTop + 0] = store0;
    stack[stackTop + 1] = store1;
    stackTop += 2;
} uint StackPop(inout int stackTop, uint tidInWave)
{
    uint top = stack[--stackTop];
    return _MakeUniform(top);
}
```

FIG. 7e
705

```
void TestLeafNodeIntersections(
      TLflags,
      TLrayOrig,
      TLrayDir,
      TLresultBary,
      TLresultT,
      TLresultTriId)

// Perform triangle testing.

{
    const uint firstId = TLflags & 0x00ffffff;
    const uint numTris = (TLflags >> 24) & 0x7f;

uint i = 0;
#if MAX_TRIS_IN_LEAF > 1
    const uint evenTris = numTris & ~1;
    for (i=0; i < evenTris; i += 2)
    {
        const uint id0 = firstId + i;

// Read both triangle IDs
        // Top bits is sort key for hit shader
        const uint2 triIds = BVHReadTwoTriangleIndices(id0);

// Read 3 vertices per triangle
        float3 v00, e00, e01;
        float3 v10, e10, e11;
        BVHReadTriangle(v00, e00, e01, triIds.x);
        BVHReadTriangle(v10, e10, e11, triIds.y);

// Check for intersectsection
        float2 bary0, bary1;
        float t0 = RayTriangleIntersectEdge(bary0, TLrayOrig, TLrayDir, v00, e00, e01);
        float t1 = RayTriangleIntersectEdge(bary1, TLrayOrig, TLrayDir, v10, e10, e11);

// Record nearest
        if (t0 < TLresultT)
        {
            TLresultBary = bary0.xy;
            TLresultT = t0;
            TLresultTriId = id0;
        } if (t1 < TLresultT)
        {
            TLresultBary = bary1.xy;
            TLresultT = t1;
            TLresultTriId = id0 + 1;
        }
    }
``` continued in FIG. 7f

FIG. 7f    706 continued from FIG. 7e

```
    if (numTris & 1)
#endif
    {
        const uint id0 = firstId + i;

// Top bits is sort key for hit shader
        const uint triId0 = BVHReadTriangleIndex(id0);

// Read 3 vertices
        float3 v00, e00, e01;
        BVHReadTriangle(v00, e00, e01, triId0);

// Intersect
        float2  bary0;
        float t0 = RayTriangleIntersectEdge(bary0, TLrayOrig, TLrayDir, v00, e00, e01);

// Record nearest
        if (t0 < TLresultT)
        {
            TLresultBary = bary0.xy;
            TLresultT = t0;
            TLresultTriId = id0;
        }
    }
}
```

NON-DIVERGENT PARALLEL TRAVERSAL OF A BOUNDING VOLUME HIERARCHY

CROSS REFERENCE TO RELATED APPLICATION

This application claims the benefit of U.S. Provisional Patent Application No. 62/547,679, filed Aug. 18, 2017, the disclosure of which is hereby incorporated by reference.

BACKGROUND

In a three-dimensional ("3D") computer graphics environment, ray tracing can be used to generate an image from the perspective of a virtual camera or other viewing point. The image includes multiple picture elements ("pixels") through which rays from the viewing point pass and continue into the 3D computer graphics environment. For a given pixel, the path of the ray (primary ray) that passes through the pixel from the viewing point is traced until it intersects with an object in the environment. The surface of the object can have a color associated with it at the intersection point, as well as values that indicate albedo (reflectivity), scattering, refraction, diffusion or another material property. Such values can be interpolated, for example, between values of properties of vertices of the object. At the intersection point, depending on the surface of the object, the ray can be reflected or refracted within the environment, or it can generate diffuse rays, to simulate optical effects such as reflection, refraction/translucence, scattering, and dispersion. The angle of the surface at the intersection point can be determined by interpolating between norms of vertices of the object, or the angle of the surface at the intersection point can be estimated as the angle of a face plane of the object. A shadow ray can be generated, in the direction of a light source, to simulate optical effects such as shading from the light source (blocking of light from the light source). Such newly generated rays (secondary rays) are similarly traced in the environment, and can generate other rays (tertiary rays), and so on. Successive rays can be generated, for example, until a threshold number of stages is reached or threshold distance is traveled. Ultimately, the value of the given pixel depends on the color of the surface of the object at the intersection point and results reported back from secondary rays, which may in turn depend on results reported back from tertiary rays, and so on, so as to simulate shadows, reflected light, refracted light, and other effects at the intersection point. Thus, in addition to the color of the surface at the intersected point, the value of the given pixel can depend on the incoming light and material properties of the object at the intersection point.

By focusing on rays that reach the viewing point, ray tracing is much simpler than tracing the paths of rays of light from light source(s) in the environment, so as to find which ones reach the viewing point. Even so, ray tracing is computationally intensive. An image can include hundreds of thousands of pixels, or even millions of pixels. Images can be rendered at a rate of 30 frames per second or higher. Typically, for each pixel, the ray that passes through the pixel is tested to see if it intersects with some subset of the objects in the environment. The environment can include numerous complex objects, which can dynamically change from image to image.

To simplify representation of the objects in the environment, complex objects can be represented with simpler geometric objects such as triangles. For example, the surface of an object can be represented as a set of triangles fitted to the surface. In addition to having vertices and/or edges that define its shape and position in the environment, a given triangle can have an associated color and material properties (or have colors and material properties associated with the vertices of the given triangle, for use in interpolation for intersection points within the given triangle). Any surface can be approximated with a set of triangles. To approximate curves or complex shapes, successively smaller triangles can be used to provide finer levels of detail.

Although triangles (or other geometric objects) provide a convenient way to represent complex objects in the environment, the resulting representation can include a very large number of geometric objects. For example, a scene can include hundreds of thousands or even millions of geometric objects. These geometric objects can be enclosed in successively larger groups, which are represented in a bounding volume hierarchy ("BVH"). A BVH is tree-structured. Geometric objects in the environment are wrapped in bounding volumes, which are typically spheres (that is, parametric spheres) or boxes (that is, rectangular prism or cubic volumes). Bounding volumes enclose geometric objects for the leaf nodes of the tree for the BVH. The leaf nodes are grouped in small sets, which typically correspond to adjoining regions of the environment. A non-leaf node (also called an interior node) encloses a small set of leaf nodes. Sets of non-leaf (interior) nodes are, in turn, enclosed within successively larger bounding volumes for shallower non-leaf (interior) nodes, in a recursive manner, until a "root" node of the BVH encloses all of the non-leaf nodes and leaf nodes. A BVH can be organized as a binary tree (with each non-leaf node having two child nodes), as a quad tree (with each non-leaf node having four child nodes), as an oct tree (with each non-leaf node having eight child nodes), or in some other way.

To test for intersections of a ray with geometric objects in a 3D computer graphics environment, the ray can be tested against a BVH. If there is an intersection between the ray and the bounding volume for the root node, the ray can be tested against the bounding volumes for the respective child nodes of the root node, and so on. In this way, the ray can be tested against successively smaller, enclosed bounding volumes. Testing for an intersection between a ray and bounding volume is relatively simple if the shape of the bounding volume is a sphere or box. When there is an intersection between the ray and the bounding volume of a leaf node, the ray can be tested for intersections with the geometric objects enclosed by the bounding volume of the leaf node. At any stage, if a ray does not intersect a given bounding volume, further tests against bounding volumes (and geometric objects) within the given bounding volume can be skipped. Stated differently, bounding volumes for child nodes need not be evaluated if the bounding volume for their parent node is not intersected. Similarly, geometric objects in a leaf node need not be evaluated if the bounding volume for the leaf node is not intersected.

There are many approaches to BVH traversal. Some early approaches are adapted for execution on single-threaded central processing unit ("CPU") architectures. More recently, approaches to BVH traversal have been proposed for graphics processing unit ("GPU") architectures. A GPU architecture typically includes multiple single-instruction, multiple data ("SIMD") units. A shader unit of a GPU can include one or more SIMD units. The SIMD width n indicates the number of elements (sometimes called lanes) of a SIMD unit. For example, a SIMD unit may include 32, 64, or some other number of elements. Each element of the SIMD unit can be considered a separate thread of the SIMD unit. A group of n threads for a SIMD unit can also be called a wave or warp. Threads of a given SIMD unit execute the same code in lockstep on (potentially) different data.

GPU-based approaches to BVH traversal suffer from code divergence and data divergence. Code divergence happens when a logical branch occurs in code and not all threads of a SIMD unit branch the same way. This may occur, for example, when a logical branch in execution happens and the threads of a SIMD unit have different branch conditions. With a SIMD architecture, the threads of the SIMD unit may not execute different code paths simultaneously, so both (or all) code branches must be executed serially. Threads are put to sleep during code paths they chose not to follow, until all branches are completed and the threads converge. In practice, this can be highly inefficient when threads frequently diverge. Data divergence happens, for example, when execution threads on different processing units access memory regions that are more and more distant at deeper levels of BVH traversal.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In summary, the Detailed Description presents various approaches to performing non-divergent parallel traversal operations for a bounding volume hierarchy ("BVH") during ray tracing. In many cases, the approaches dramatically improve the speed of BVH traversal. In some example implementations for extra-wide single-instruction, multiple data ("SIMD") graphics processing unit ("GPU") architectures, the non-divergent parallel BVH traversal operations address problems of code divergence and data divergence, while still using simple stack data structures to track the order of traversal operations.

According to a first set of innovations described herein, a computer system has a processing unit with multiple threads that, collectively, perform ray tracing for multiple rays in parallel in a computer-represented environment. The rays are part of a group of rays traced by the threads, which are part of a group such as a wave, warp, etc. of threads of the processing unit. The environment includes multiple geometric objects (such as triangles) enclosed in a BVH. Each of the threads receives one or more parameters for a given ray among the rays of the group and traverses the BVH to determine an intersection, if any, between the given ray and a given geometric object among the geometric objects of the BVH. The order of traversal of the BVH is synchronized between the threads for the respective rays of the group. For example, the threads use a cross-group operation to synchronize the order of traversal of the BVH between the threads. In general, the cross-group operation accepts an input value (e.g., as part of a vector variable) from the respective threads and produces a uniform output value to the respective threads. The cross-group operation can be a ballot operation, with each of the threads providing one vote in the ballot operation. In this way, the overall speed of the BVH traversal can be improved in many cases.

Similarly, according to a second set of innovations described herein, a computer system has a processing unit with threads that, collectively, perform ray tracing for multiple rays of a group in parallel in a computer-represented environment, which includes multiple geometric objects enclosed in a BVH. The threads receive parameters for the rays and traverse the BVH to determine intersections, if any, between the rays, respectively, and one or more of the geometric objects of the BVH. The order of traversal of the BVH is synchronized between the multiple threads for the respective rays, e.g., using a cross-group operation such as a ballot operation.

According to a third set of innovations described herein, a computer system has a processing unit with multiple threads that, collectively, perform ray tracing for multiple rays of a group in parallel in a computer-represented environment, which includes multiple geometric objects enclosed in a BVH. Coherence of the rays in the group is estimated. The threads receive parameters for the multiple rays. The threads determine whether the estimated coherence of the multiple rays satisfies a threshold. If so, the threads traverse the BVH in a uniform traversal mode to determine intersections, if any, between the respective rays of the group and one or more of the geometric objects of the BVH. Otherwise, the threads traverse the BVH in a non-uniform traversal mode to determine the intersections, if any, between the respective rays of the group and one or more of the geometric objects of the BVH. In this way, the threads can selectively perform non-divergent parallel BVH traversal operations for a coherent group of rays, when they are expected to be more efficient than divergent parallel BVH traversal operations.

The innovations described herein can be implemented as part of a method, as part of a computer system configured to perform the method or as part of a tangible computer-readable media storing computer-executable instructions for causing a computer system, when programmed thereby, to perform the method. The various innovations can be used in combination or separately. The foregoing and other objects, features, and advantages of the invention will become more apparent from the following detailed description, which proceeds with reference to the accompanying figures.

BRIEF DESCRIPTION OF THE DRAWINGS

FIGS. 6b and 6c are listings of actions during non-divergent parallel traversal operations of the BVH without and with, respectively, prioritized scheduling of nodes.

FIGS. 7a-7f are code listings for an example implementation of non-divergent parallel BVH traversal operations.

DETAILED DESCRIPTION

Figure 1:
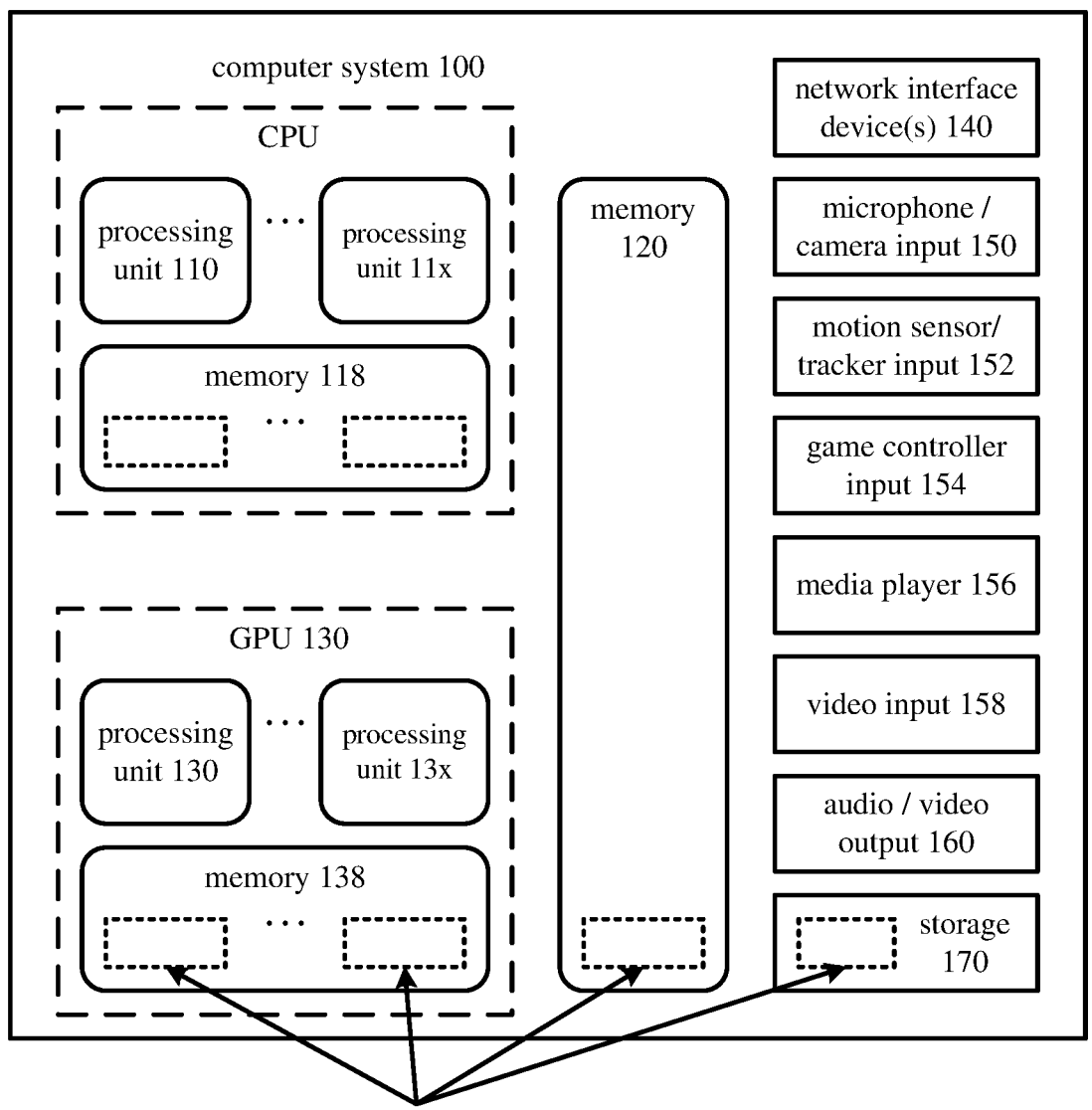
FIG. 1 is a diagram illustrating an example computer system in which one or more of the approaches described herein can be implemented.

Various approaches to performing non-divergent parallel traversal operations for a bounding volume hierarchy ("BVH") during ray tracing are presented herein. In many cases, the approaches dramatically improve the speed of BVH traversal. In some example implementations for extra-wide single-instruction, multiple data ("SIMD") graphics processing unit ("GPU") architectures, the non-divergent parallel BVH traversal operations address problems of code divergence and data divergence, while still using a simple stack data structure to track the order of traversal operations.

In prior approaches to BVH traversal for a SIMD GPU architecture, performance can suffer because threads of a SIMD unit take different paths in the BVH for different rays. In contrast, in some example implementations of the approaches described herein, threads of a SIMD unit in a SIMD GPU architecture use a cross-group operation to synchronize traversal between the threads. The cross-group operation spans separate lanes of processing otherwise used by the respective threads of the SIMD unit. In general, the cross-group operation accepts an input value (e.g., as part of a vector variable) from the respective threads and produces a uniform output value to the respective threads. For example, the cross-group operation is a ballot operation to which each of the threads provides an input value, which can be aggregated by the ballot operation. The cross-group operation provides a uniform result to the threads of the SIMD unit. By following the uniform result of the cross-group operation, the threads of the SIMD unit follow the same order of traversal. For example, if one thread finds an intersection between its ray and a bounding volume for a given node, all of the threads of the SIMD unit perform further operations within the given node. On the other hand, if no thread finds an intersection between its ray and the bounding volume for the given node, all of the threads of the SIMD unit skip further operations within the given node. This eliminates data divergence during BVH traversal, as all rays of a group traverse the BVH in tandem. By having uniform data, threads of the SIMD unit inherently share the same load operations and memory storage with respect to bounding volume data and geometric object data. For 64 rays, for example, 64 threads of a SIMD unit use the same load operations and memory storage, instead of 64 different sets of load operations and memory storage. Also, the code does not diverge (code divergence is not a problem), though some threads may "sleep," which saves bandwidth as they do not load data or store data in memory while sleeping. On the other hand, the non-divergent parallel traversal approach can lead to wasted processor cycles when testing for intersections between a ray and geometric objects, to the extent a ray has no possible intersections in a bounding box that includes the geometric objects but its thread is nevertheless is brought to that stage of processing along with threads for other rays. In typical scenarios in which coherent rays are traced, however, the non-divergent parallel BVH traversal operations can provide a 2× or even 3× improvement to performance, compared to similar divergent parallel BVH traversal operations for the same rays.

As used herein, the term "ray tracing" encompasses light ray tracing operations for rendering or special effects in a 3D computer graphics environment. The term "ray tracing" also encompasses other types of applications, such as tracing of rays for collision detection in a physics simulation environment, tracing of rays to model acoustic phenomena in a sound environment, or tracing of rays in another computer-represented environment. The computer-represented environment can represent a real-world scene (e.g., constructed from imaging/scanning of a real-world scene), represent a synthetic, virtual scene (e.g., constructed entirely from graphics processing tools, or created for a virtual reality application), or represent a hybrid scene that blends results of imaging/scanning of a real-world scene and computer-generated content (e.g., constructed for an augmented reality application).

Although operations described herein are in places described as being performed by a GPU architecture for a gaming console, head-mounted display, or graphics card of a desktop computer system, in many cases the operations can be performed by another type of architecture (e.g., a multi-core CPU architecture) and/or other type of computer system (e.g., smartphone, tablet computer). More generally, various alternatives to the examples described herein are possible. For example, certain techniques described with reference to flowchart diagrams can be altered by changing the ordering of stages shown in the flowcharts, by splitting, repeating or omitting certain stages, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computer Systems.

FIG. 1 illustrates a generalized example of a suitable computer system (100) in which several of the described innovations may be implemented. The innovations described herein relate to ray tracing, which in general involves tracing rays from a viewing point as the rays pass through an image and continue into a computer-represented environment. The ray tracing can involve light ray tracing operations in a 3D computer graphics environment. Or, the ray tracing can be part of another type of application, such as tracing of rays for detection of collisions of particles, objects, etc. in a physics simulation environment, tracing of rays to model acoustic phenomena in a sound environment, or tracing of rays in another computer-represented environment. Aside from its use in ray tracing, the computer system (100) is not intended to suggest any limitation as to scope of use or functionality, as the innovations may be implemented in diverse computer systems, including special-purpose computer systems adapted for graphics processing or modeling of complex environments.

With reference to FIG. 1, the computer system (100) includes processing units (110 . . . 11x) and local memory (118) of a central processing unit ("CPU"). The processing units (110 . . . 11x) are, for example, processing cores on a single chip, and execute computer-executable instructions. The number of processing units (110 . . . 11x) of the CPU depends on implementation and can be, for example, 4 or 8. The local memory (118) may be volatile memory (e.g., registers, cache, RAM), non-volatile memory (e.g., ROM, EEPROM, flash memory, etc.), or some combination of the two, accessible by the respective processing unit(s) (110 . . . 11x).

The computer system (100) also includes processing units (130 . . . 13x) and local memory (138) of a GPU. The number of processing units (130 . . . 13x) of the GPU depends on implementation. The processing units (130 . . . 13x) are, for example, single-instruction, multiple data ("SIMD") units of the GPU. A shader unit or other processing block of the GPU can include one or more SIMD units. The SIMD width n, which depends on implementation, indicates the number of elements (sometimes called lanes) of a SIMD unit. For example, the number of elements (lanes) of a SIMD unit can be 16, 32, 64, or 128 for an extra wide SIMD architecture. Each element of the SIMD unit can be considered a separate thread of the SIMD unit. A group of n threads for a SIMD unit can also be called a wave or warp. Threads of a given SIMD unit execute the same code in lockstep on (potentially) different data. In some GPU architectures, a SIMD unit can have an extra lane for data that is the same across all threads of the SIMD unit, which results in a group of n threads plus one scalar thread for that SIMD unit (the scalar thread does not execute code like then threads of the SIMD unit). The local memory (138) may be volatile memory (e.g., registers, cache, RAM), non-volatile memory (e.g., ROM, EEPROM, flash memory, etc.), or some combination of the two, accessible by the respective processing unit(s) (130 . . . 13x). The local memory (138) stores software (180) implementing one or more innovations for non-divergent parallel traversal of a BVH, for operations performed by threads executing on the respective processing units (130 . . . 13x), in the form of computer-executable instructions. The threads of one of the processing units (130 . . . 13x) execute the computer-executable instructions in lockstep for a group of rays.

The computer system (100) includes shared memory (120), which may be volatile memory (e.g., registers, cache, RAM), non-volatile memory (e.g., ROM, EEPROM, flash memory, etc.), or some combination of the two, accessible by the processing unit(s) (110 . . . 11x) of the CPU and the processing units (130 . . . 13x) of the GPU. The memory (120) stores software (180) implementing one or more innovations for non-divergent parallel traversal of a BVH, at least for high-level control of operations performed by threads of the processing units (130 . . . 13x), in the form of computer-executable instructions. In the GPU, a thread (also called an execution thread or thread of execution), in general, executes a sequence of computer-executable instructions and may have data (e.g., defining a state) associated with it in local memory (138) and/or shared memory (120). Threads also execute on processing units (110 . . . 11x) of the CPU, where such a thread, in general, includes a sequence of computer-executable instructions and may have data (e.g., defining a state) associated with it in local memory (118) and/or shared memory (120).

Alternatively, a processing unit can be a processor in an application-specific integrated circuit ("ASIC") or any other type of processor. The processing unit(s) (110 . . . 11x, 130 . . . 13x) can be part of a system-on-a-chip ("SoC").

The computer system (100) includes one or more network interface devices (140). The network interface device(s) (140) enable communication over a network to another computing entity (e.g., server, other computer system). The network interface device(s) (140) can support wired connections and/or wireless connections, for a wide-area network, local-area network, personal-area network or other network. For example, the network interface device(s) can include one or more Wi-Fi transceivers, an Ethernet port, a cellular transceiver and/or another type of network interface device, along with associated drivers, software, etc. The network interface device(s) (140) convey information such as computer-executable instructions, audio or video input or output, or other data in a modulated data signal over network connection(s). A modulated data signal is a signal that has one or more of its characteristics set or changed in such a manner as to encode information in the signal. By way of example, and not limitation, the network connections can use an electrical, optical, RF, or other carrier.

A camera input (150) accepts video input in analog or digital form from a video camera, which captures natural video. An audio input accepts audio input in analog or digital form from a microphone (150), which captures audio.

The computer system (100) optionally includes a motion sensor/tracker input (152) for a motion sensor/tracker, which can track the movements of a user and objects around the user. For example, the motion sensor/tracker allows a user (e.g., player of a game) to interact with the computer system (100) through a natural user interface using gestures and spoken commands. The motion sensor/tracker can incorporate gesture recognition, facial recognition and/or voice recognition.

A game controller input (154) accepts control signals from one or more game controllers, over a wired connection or wireless connection. The control signals can indicate user inputs from one or more directional pads, buttons, triggers and/or one or more joysticks of a game controller. The control signals can also indicate user inputs from a touchpad or touchscreen, gyroscope, accelerometer, angular rate sensor, magnetometer and/or other control or meter of a game controller.

The computer system (100) optionally includes a media player (156) and video input (158). The media player (156) can play DVDs, Blu-ray disks, other disk media and/or other formats of media. The video input (158) can accept input video in analog or digital form (e.g., from a cable input, HDMI input or other input).

A video output (160) provides video output to a display device. The video output (160) can be an HDMI output or other type of output. An audio output (160) provides audio output to one or more speakers.

The storage (170) may be removable or non-removable, and includes magnetic media (such as magnetic disks, magnetic tapes or cassettes), optical disk media and/or any other media which can be used to store information and which can be accessed within the computer system (100). The storage (170) stores instructions for the software (180) implementing one or more innovations for non-divergent parallel traversal of a BVH.

The computer system (100) may have additional features. For example, the computer system (100) includes one or more other input devices and/or one or more other output devices. The other input device(s) may be a touch input device such as a keyboard, mouse, pen, or trackball, a scanning device, or another device that provides input to the computer system (100). The other output device(s) may be a printer, CD-writer, or another device that provides output from the computer system (100).

An interconnection mechanism (not shown) such as a bus, controller, or network interconnects the components of the computer system (100). Typically, operating system software (not shown) provides an operating environment for other software executing in the computer system (100), and coordinates activities of the components of the computer system (100).

The innovations can be described in the general context of computer-readable media. Computer-readable media are any available tangible media that can be accessed within a computing environment. By way of example, and not limitation, with the computer system (100), computer-readable media include memory (118, 120, 138), storage (170), and combinations thereof. The term computer-readable media does not encompass transitory propagating signals or carrier waves.

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computer system or device. In general, a computer system or device can be local or distributed, and can include any combination of special-purpose hardware and/or hardware with software implementing the functionality described herein.

For the sake of presentation, the detailed description uses terms like "determine," "receive" and "provide" to describe computer operations in a computing system. These terms denote operations performed by a computer, and should not be confused with acts performed by a human being. The actual computer operations corresponding to these terms vary depending on implementation.

II. Examples of Ray Tracing and Bounding Volume Hierarchies.

Figure 2:
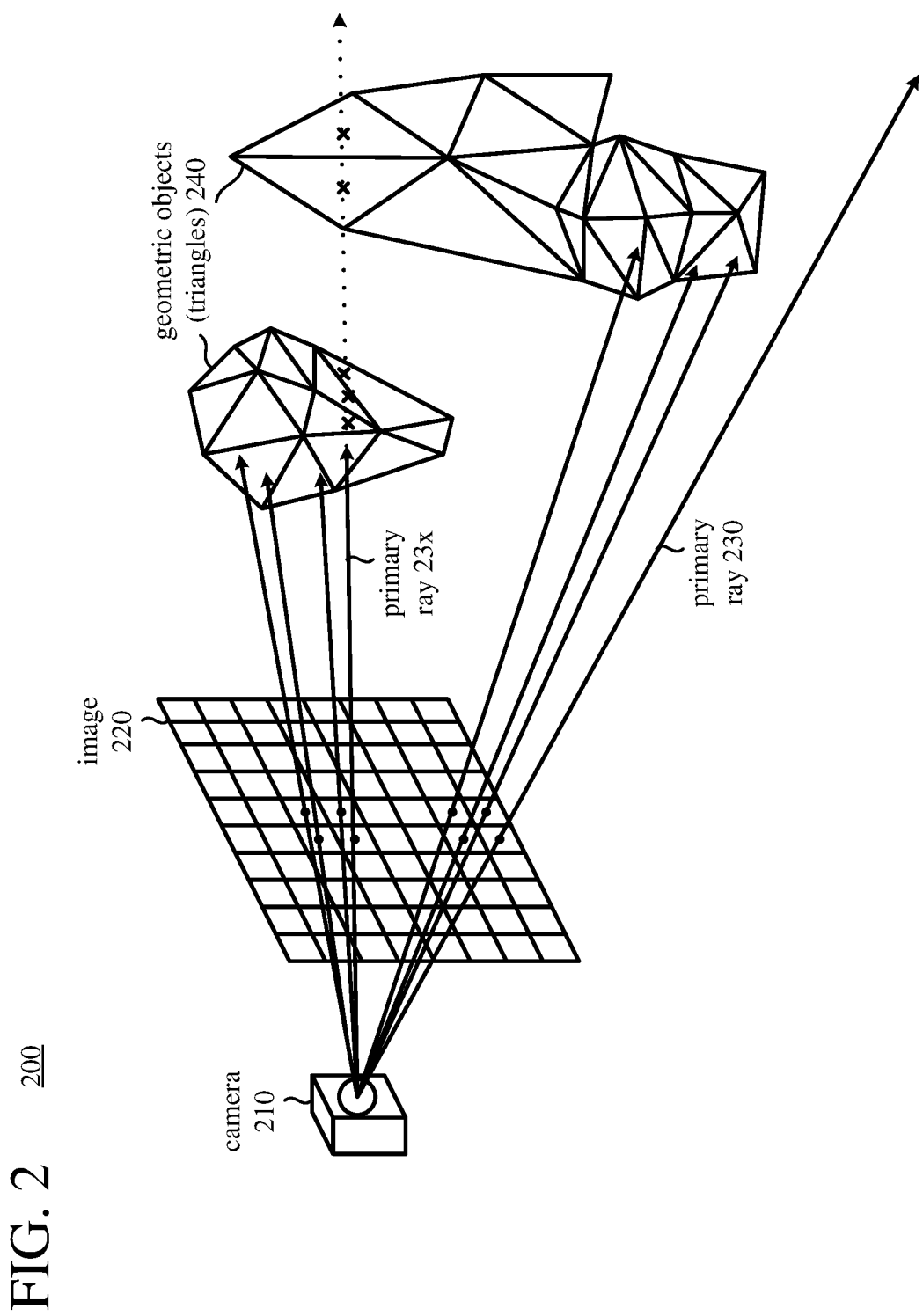
FIG. 2 is a diagram illustrating an example of ray tracing in a 3D computer graphics environment.

FIG. 2 shows an example (200) of ray tracing in a 3D computer graphics environment. The ray tracing generates an image (220) from the perspective of a virtual camera (210), which represents a viewing point. Rays (230 . . . 23x) from the camera (210) pass through pixels of the image (220) into the environment. The environment includes geometric objects (240), which are triangles in FIG. 2. The triangles are fitted to the surfaces of more complex shapes in the environment. For the sake of illustration, FIG. 2 shows a very small image (220) and a handful of geometric objects (240). In practice, an image may include hundreds of thousands or even millions of pixels, and the environment may include hundreds of thousands or even millions of geometric objects (240).

The rays (230 . . . 23x) from the virtual camera (210) (also called view rays or camera rays) are an example of primary rays. For a given pixel of the image (220), the path of the primary ray (230 . . . 23x) that passes through the pixel is traced until it intersects with one of the geometric objects (240) in the environment. In FIG. 2, each of the rays (230 . . . 23x) ends at an intersection point if it intersects one of the geometric objects (240). In FIG. 2, one of the primary rays (230) does not intersect any of the geometric objects (240). A given ray can potentially intersect multiple geometric objects (240), as shown for one of the rays (23x) with multiple intersections marked with x's. In this case, the intersection closest to the virtual camera (210) is counted as the intersection of the primary ray (23x).

Each of the geometric objects (240) has vertices and/or edges that define its shape and position in the environment. In addition, the surface of each of the geometric objects (240) can have a color associated with it, as well as values that indicate albedo (reflectivity), scattering, refraction, diffusion or another material property (or, vertices of the geometric object (240) can have associated colors and material properties, for use in interpolation for intersection points within the geometric object (240)). At an intersection point, depending on the surface of the geometric object (240) at the intersection point, a ray (230 . . . 23x) can be reflected or refracted within the environment, or it can generate diffuse rays, to simulate optical effects such as reflection, refraction/translucence, scattering, and dispersion. Also, for each light source, a shadow ray can be generated from the intersection point, in the direction of the light source, to simulate optical effects such as shading from the light source (that is, blocking of light from the light source).

Reflected rays, refracted rays, diffuse rays, and shadow rays that stem from the intersection point of a primary ray (230 . . . 23x) are examples of secondary rays. Such secondary rays are similarly traced in the environment, and can generate other rays (tertiary rays), and so on. Successive rays can be generated, for example, until a threshold number of stages is reached or threshold distance is traveled. Ultimately, for a given pixel of the image (220), the value of the given pixel depends on the color of the surface of the object (240) at the intersection point as well as results reported back from secondary rays, which may in turn depend on results reported back from tertiary rays, and so on. In this way, the ray tracing can simulate shadows, reflected light, refracted light, and other effects at the intersection point for the primary ray (230 . . . 23x). Thus, in addition to the color of the surface at the intersected point for the primary ray (230 . . . 23x), the value of a given pixel of the image (220) can depend on the incoming light and material properties of the object at the intersection point for the primary ray (230 . . . 23x).

Although geometric objects (240) such as triangles provide a convenient way to represent complex objects in the environment, the resulting representation can include a very large number of geometric objects (240). To organize the geometric objects (240) and simplify the process of finding intersection points for rays, the geometric objects (240) can be enclosed in successively larger groups, which are represented in a bounding volume hierarchy ("BVH").

Figure 3:
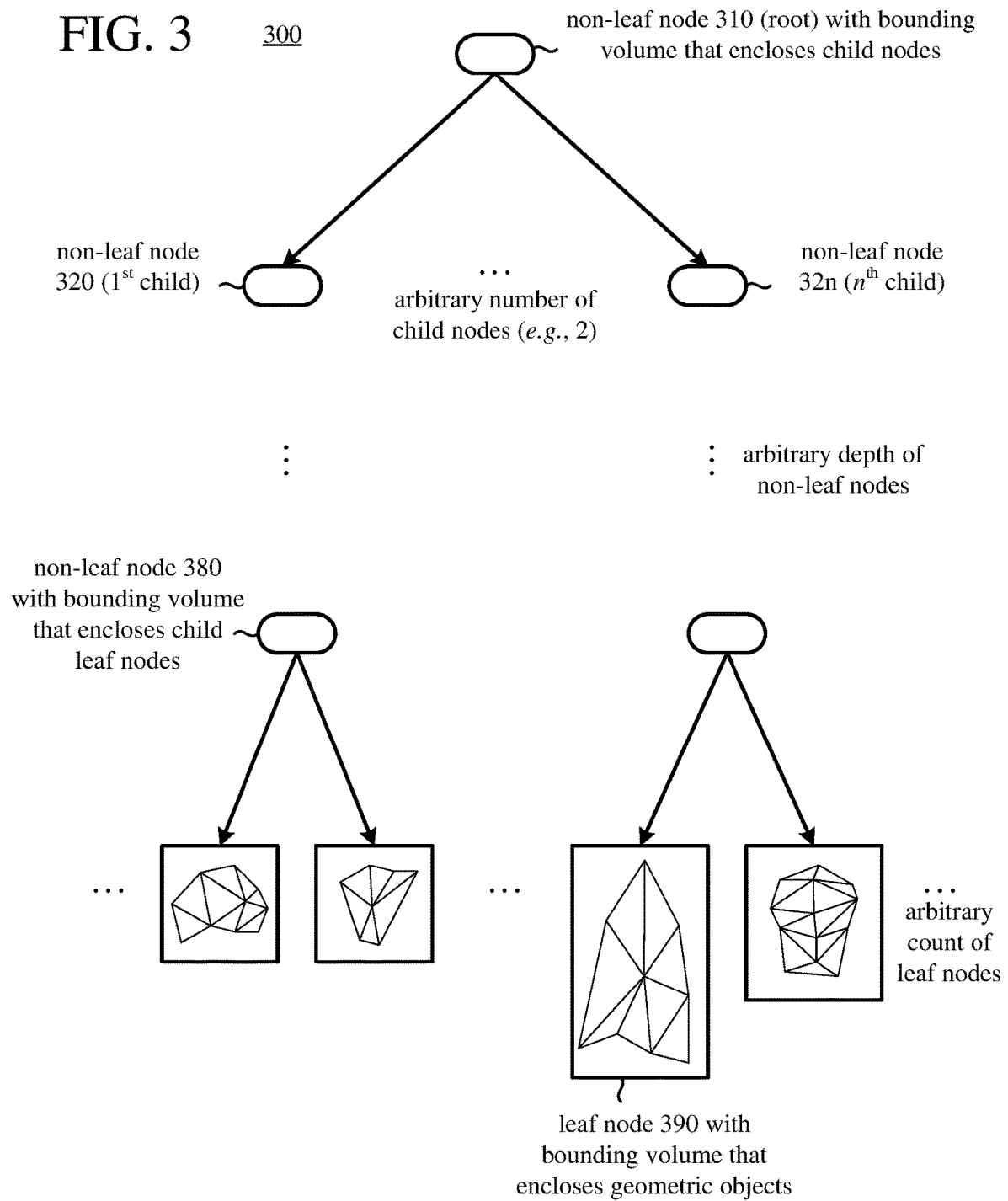
FIG. 3 is diagram illustrating an example of BVH for geometric objects in the environment of FIG. 2.

FIG. 3 shows an example (300) of BVH for geometric objects in the environment of FIG. 2. The BVH (300) is structured as a tree. For a leaf node (390) of the BVH (300), a subset of the geometric objects (240) in the environment is wrapped in a bounding volume. The bounding volume is typically a sphere (that is, a parametric sphere) or box (that is, a rectangular prism or cubic volume). In some example implementations, the bounding volume is an axis-aligned bounding box ("AABB"). In the BVH (300) of FIG. 3, the bounding volumes are bounding boxes. Collectively, bounding volumes for leaf nodes of the BVH (300) enclose all of the geometric objects (240) of the environment.

The leaf nodes are grouped in small sets, which typically correspond to adjoining regions of the environment. A non-leaf node (380), which can also be called an interior node, has a bounding volume that encloses a small set of leaf nodes, which are the child leaf nodes of the non-leaf node (380). At the level of the BVH (300) above the leaf nodes, non-leaf nodes have bounding volumes that, collectively, enclose all of the leaf nodes. In a recursive manner, sets of non-leaf nodes at a given level are, in turn, enclosed within successively larger bounding volumes through an arbitrary depth of non-leaf nodes. Eventually, a root node (310) of the BVH (300) encloses all of the non-leaf nodes and leaf nodes of the BVH (300).

As shown in FIG. 3, a non-leaf node (310, 380) has a bounding volume that encloses child nodes of the non-leaf node. In FIG. 3, the root node (310) has non-leaf nodes (320 . . . 32n) for a $1^{st}$ child through $n^{th}$ child. In general, each non-leaf node (310, 380) has an arbitrary number of child nodes (e.g., 2, 4, 8). Typically, each non-leaf node of the BVH (300) has the same number of child leaf nodes. Thus, the BVH (300) can be organized as a binary tree (with each non-leaf node having two child nodes), as a quad tree (with each non-leaf node having four child nodes), as an oct tree (with each non-leaf node having eight child nodes), or in some other way.

III. Example Approaches to Non-Divergent Parallel BVH Traversal.

To test for intersections of a ray with geometric objects in a 3D computer graphics environment, the ray can be tested against a BVH that encloses the geometric objects. If there is an intersection between the ray and the bounding volume for the root node of the BVH, the ray can be tested against the bounding volumes for the respective child nodes of the root node, and so on. In this way, the ray can be tested against successively smaller, enclosed bounding volumes of the BVH. When there is an intersection between the ray and the bounding volume of a leaf node of the BVH, the ray can be tested for intersections with the geometric objects enclosed by the bounding volume of the leaf node. At any stage, if a ray does not intersect a given bounding volume, further tests against bounding volumes (and geometric objects) within the given bounding volume can be skipped. In other words, bounding volumes for child nodes of a BVH need not be evaluated if the bounding volume for their parent node is not intersected. Similarly, geometric objects in a leaf node of the BVH need not be evaluated if the bounding volume for the leaf node is not intersected.

For a GPU architecture, BVH traversal can be performed in parallel for a group of n rays, using n threads of a processing unit. (More specifically, the processing is performed using n threads of a processing unit such as a SIMD unit.) A GPU architecture typically includes multiple processing units (e.g., SIMD units of a GPU). A shader unit or other processing block of the GPU can include one or more SIMD units. The SIMD width n, which depends on implementation, indicates the number of elements (sometimes called lanes) of a SIMD unit. For example, the SIMD width n can be a value $2^s$, where s is an integer greater than 0, for 2, 4, 8, 16, 32, 64, or 128 elements of a SIMD unit). Each element of the SIMD unit can be considered a separate thread of the SIMD unit. A group of n threads for a SIMD unit can also be called a wave or warp. The n threads of a SIMD unit execute the same code in lockstep on (potentially) different data for the n threads. For parallel BVH traversal for a group of n rays, each of the n threads runs the same set of instructions. For example, the n threads can all execute code for BVH traversal operations in parallel for the n rays. Or, the n threads can all execute code for leaf processing operations in parallel for the n rays (e.g., intersection tests for triangles or other geometric objects).

When threads make BVH traversal decisions independently for different rays, all-or-nothing behavior about which code to execute (BVH traversal code or leaf processing code) can lead to inefficient, divergent patterns. For example, when some threads have reached leaf nodes through one branch of code, while other threads are still at non-leaf nodes through another branch of code, the different code branches are executed serially. This is an example of code divergence. Threads are put to sleep during code paths they chose not to follow until all branches are completed, and the threads converge. When threads traverse a BVH out of synchronization, there may be "bubbles" in which threads are idle.

Further, in divergent parallel traversal operations, even when threads all execute the same code for BVH traversal operations, threads can diverge with respect to which non-leaf nodes are being evaluated. For independent traversal decisions, different threads may use different stacks (or other structures) during BVH traversal, and load different triangle data during leaf processing. Having threads with different stack states for their stacks, and having threads access different triangle data, are examples of data divergence, which can increase memory utilization.

This section describes examples of non-divergent parallel BVH traversal operations. In general, n threads execute code to evaluate a group of n rays in parallel, in lock step with regard to order of traversal of the BVH. This enforces code convergence between the threads. Also, since different threads use the same stack (or other structures) during BVH traversal, and access the same triangle data during leaf processing, data divergence is mitigated, and less memory is used.

Each of the n threads traces a single ray in the group of n rays. The n rays have different ray directions and can potentially intersect different geometric objects. Intersection points (distances, coordinates, etc.) will typically be different even if the n rays intersect the same geometric object. The data that is unique per ray can be termed "vector" data or divergent data. The data that is uniform for all of the n rays can be termed "scalar" data, uniform data, or non-divergent data. Making data the same for all of the n rays can be termed "scalarizing" or "converging" the data for the n rays. Scalarizing/converging data for the n rays can help synchronize order of BVH traversal (avoiding code divergence) and reduce memory utilization (avoiding data divergence).

The non-divergent parallel BVH traversal operations tend to work well for n rays that start from the same ray origin and have similar ray directions, which is an example of coherent rays. Such rays are likely to naturally follow the same order of traversal of the BVH. Overall processing is faster if bounding volumes can be pruned, during BVH traversal, as not including any geometric objects that could yield intersections better (closer) than the intersections that have already been found quickly for the n rays. On the other hand, non-divergent parallel BVH traversal operations tend not to work well if n rays exhibit scattering or other non-uniform behavior, which are examples of incoherent rays. In this case, the entire BVH may need to be traversed anyway in order to find good intersections for all of the n rays, with some overhead inefficiency due to imposition of uniform operations during BVH traversal.

Figure 4:
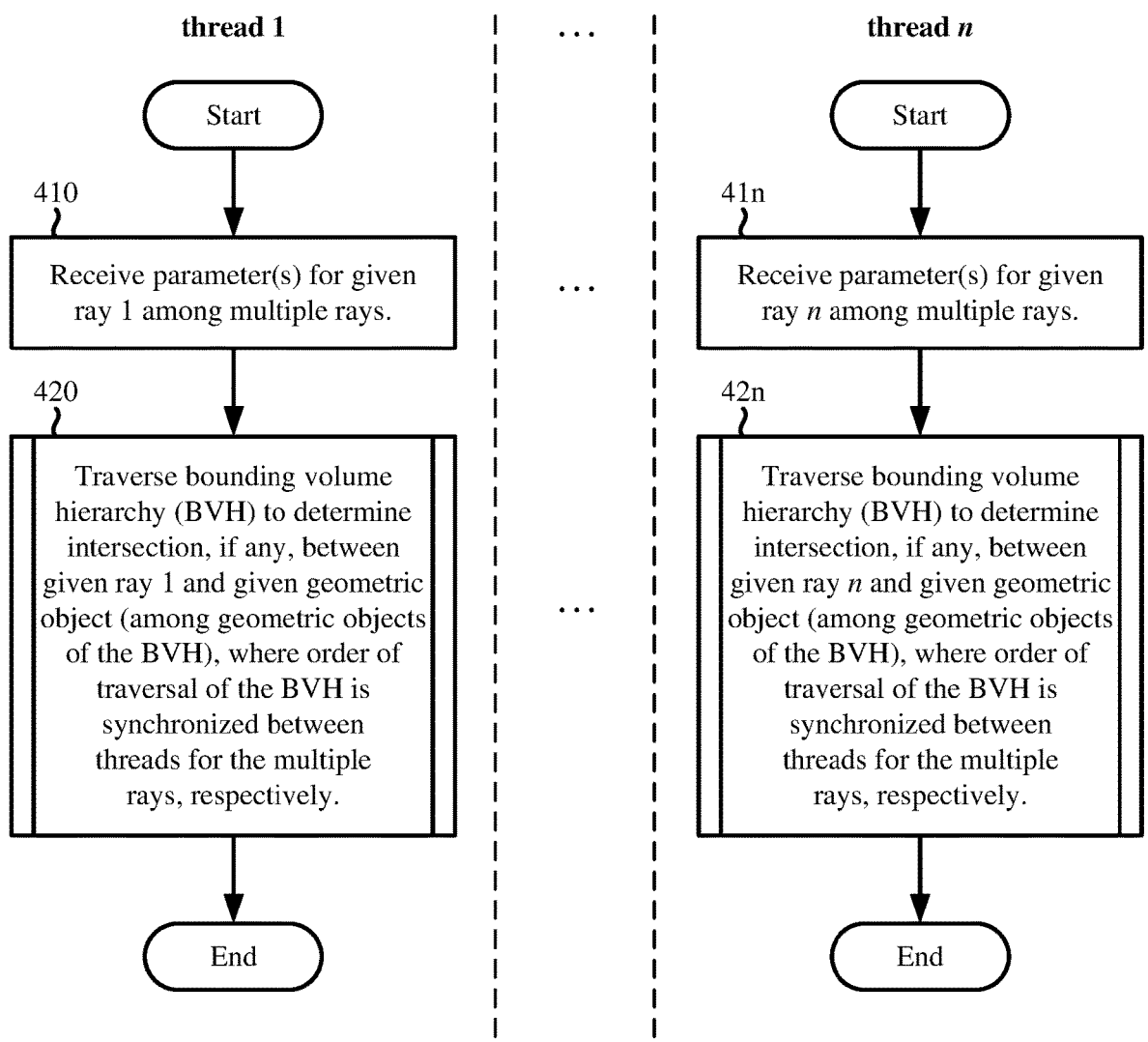
FIG. 4 is a flowchart illustrating a generalized technique for non-divergent parallel traversal of a BVH during ray tracing.

FIG. 4 shows a generalized technique (400) for non-divergent parallel traversal of a BVH during ray tracing. The technique (400) can be performed, for example, by processing units of a computer system that implements a ray tracing tool. The computer system includes a processing unit with multiple threads in a group (such as a wave or warp), which perform ray tracing for multiple rays of a group in parallel in a computer-represented environment. For example, in some example implementations, the multiple processing units are shader units or other processing blocks of a GPU, and the multiple threads are elements (lanes) of one of the SIMD units. Alternatively, the multiple processing units can be processor cores of one or more CPUs.

The computer-represented environment includes multiple geometric objects enclosed in a BVH. For example, the geometric objects are triangles or another type of geometric object. The BVH has multiple leaf nodes and one or more non-leaf nodes. Each of the leaf nodes includes one or more of the geometric objects enclosed in the BVH. More specifically, each of the leaf nodes represents a bounding volume around the geometric object(s) of that leaf node. Each of the non-leaf node(s) represents a bounding volume around one or more of the leaf nodes or other non-leaf nodes (at a layer of the BVH closer to the leaf nodes).

FIG. 4 shows the behavior of multiple threads executing code in parallel, including thread 1 to thread n. The same set of instructions (e.g., for BVH traversal, for leaf processing) is executable on each of the threads. The n threads, collectively, determine intersections, in any, for a group of n rays as the multiple rays. For example, n is a value $2^s$, where s is an integer greater than 0. Thus defined, n can be 2, 4, 8, 16, 32, 64, 128, or some other value. Each of the threads performs operations for a different one of the n rays.

Each of the threads, receives (410, 41n) one or more parameters for a given ray among the multiple rays. For example, the parameter(s) for a given ray include an origin of the given ray, a direction of the given ray, and a distance to a leading intersection for the given ray, which is the closest intersection (to the ray origin) found so far for the given ray. To facilitate certain operations during BVH traversal, the parameter(s) for the given ray can also include an inverse direction of the given ray and/or a value indicating the origin of the given ray times the inverse direction of the given ray. Alternatively, the parameter(s) for the given ray include other and/or additional parameters.

Each of the n threads traverses (420, 42n) the BVH to determine an intersection, if any, between its given ray and a given geometric object among the geometric objects of the BVH. The order of traversal of the BVH is synchronized between the n threads for the respective rays. In particular, the traversing uses a cross-group operation in order to synchronize the traversal of the BVH between the n threads for the n rays. In general, the cross-group operation accepts an input value (e.g., as part of a vector variable) from the n threads and produces a uniform output value to the n threads. For example, the cross-group operation is a ballot operation, with each of the n threads providing one vote in the ballot operation. Based on the results of the cross-group operation, which are the same for all of the n threads, each of the n threads can determine whether a bounding volume for a node being evaluated (by all of the threads) may include, for any of the n rays, any new intersection closer than a leading intersection for that ray. For example, if any of the n rays intersects the bounding box at a location better (closer) than the leading intersection found so far for that ray, then all n threads continue the BVH traversal process within the node.

In some example implementations, the traversing uses stack push operations and stack pop operations on a shared stack to track position within the BVH. The shared stack is maintained in memory accessible to the multiple threads, which reduces memory utilization. In general, the traversing follows a selective depth-first traversal pattern.

Figure 5:
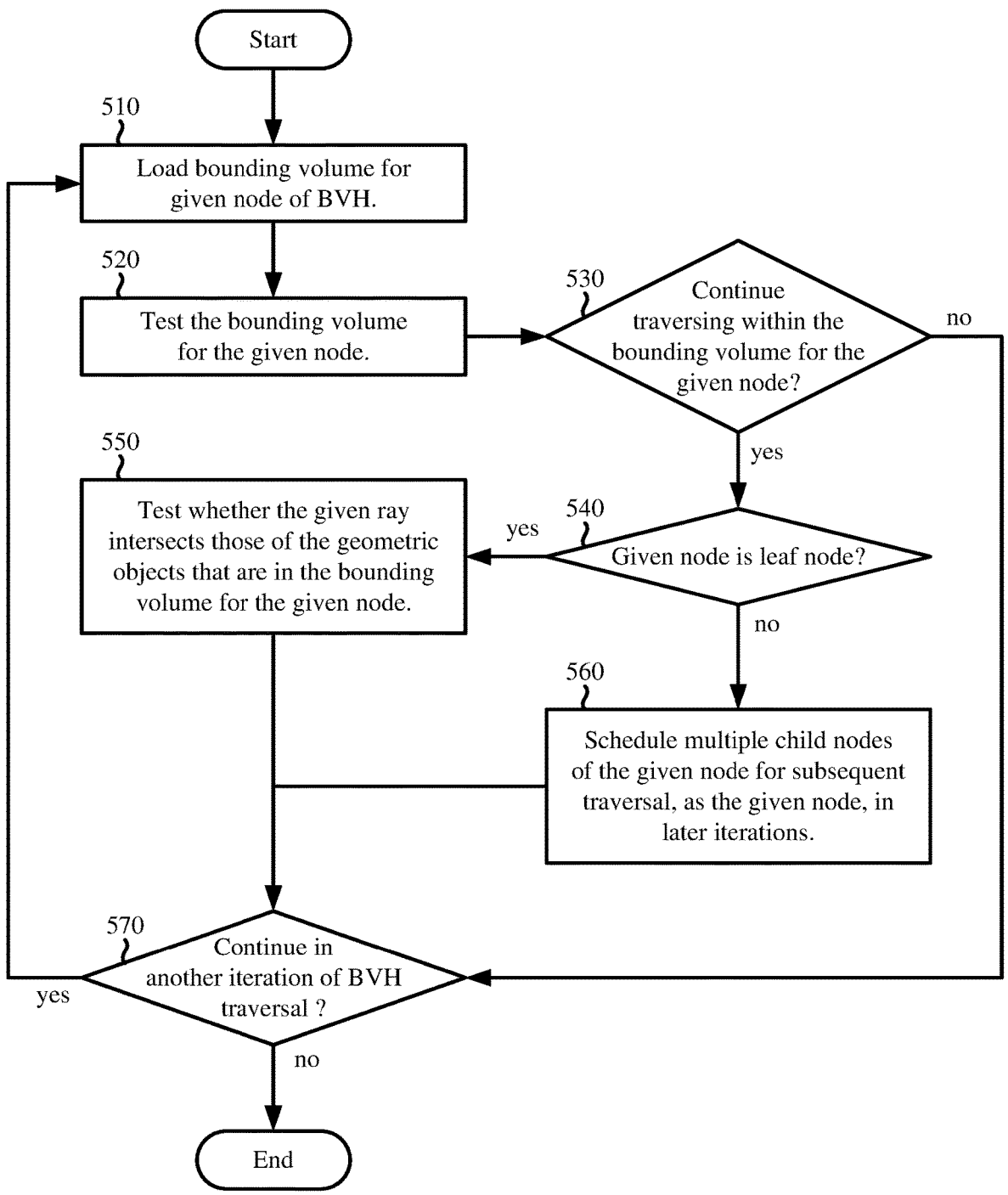
FIG. 5 is a flowchart of an example technique for the traversal stage of the generalized technique.

FIG. 5 shows an example technique (500) for the traversal stage (420, 42n) of the generalized technique (400). For the technique (500), each of the n threads performs, for a different ray, operations in multiple iterations.

The thread loads (510) a bounding volume for a given node of the BVH. For example, the bounding volume is a bounding box. Alternatively, the bounding volume has another shape (e.g., sphere). For the first iteration, the given node can be the root node of the BVH.

For the given ray, the thread tests (520) the bounding volume for the given node. For example, the thread checks whether the bounding volume for the given node may include any new intersection closer than a leading intersection for the given ray for the thread.

Then, the thread determines (530) whether to continue the traversing within the bounding volume for the given node. For example, the determining (530) uses a cross-group operation to synchronize the order of traversal of the BVH between the n threads for the n rays, respectively. The cross-group operation can be a ballot operation, with each of the n threads providing one vote in the ballot operation. Alternatively, the cross-group operation is another type of operation. In this way, the n threads can, collectively, determine if any of the n rays intersects the bounding volume at a location better (closer) than the leading intersection found so far for that ray.

If the thread determines to continue the traversing within the bounding volume for the given node, the thread determines (540) whether the given node is a leaf node. This can be determined, for example, by checking a flag for the given node.

If the given node is a leaf node, in a leaf processing stage, the thread tests (550) whether its given ray intersects those of the multiple geometric objects that are in the bounding volume for the given node. Section VI describes examples of leaf processing operations. Alternatively, the leaf processing operations are performed in another way.

Otherwise (the given node is not a leaf node), the thread schedules (560) multiple child nodes of the given node for subsequent traversal, as the given node, in later ones of the multiple iterations. For example, the thread pushes node indices for left and right child nodes of the given node on a stack. In any case, the n threads schedule child nodes for subsequent traversal in the same order, so that BVH traversal operations remain synchronized for the non-divergent parallel traversal operations.

The thread checks (570) whether to continue in another iteration of BVH traversal. If so, the thread loads (510) the bounding volume for the next (scheduled) node in the BVH traversal. In general, the traversing follows a selective depth-first traversal pattern. The BVH traversal completes when all nodes have been evaluated or skipped as part of pruned branches of the BVH.

After the traversing completes for a given ray, one or more parameters represent the intersection, if any, between the given ray and an intersected geometric object of the BVH. For example, the parameter(s) that represent the intersection, if any, include an identifier of the intersected geometric object, coordinates of the intersection within the intersected geometric object, and a distance to the intersection. Alternatively, the parameter(s) that represent the intersection include other and/or additional parameters.

For non-divergent parallel traversal operations with prioritized scheduling, a thread determines ray direction sign information for each of one or more dimensions of the computer-represented environment. For example, the thread can determine ray direction sign information for each of x, y, and z dimensions. Before the prioritized scheduling is performed, all of the n threads determine the same (uniform) ray direction sign information. As part of the traversing, the threads can use the ray direction sign information to prioritize scheduling of nodes in the BVH. When the rays of a group are coherent, the ray direction sign information is likely representative of the group. The prioritization facilitates fast determination of good (close) intersections for the n rays, and subsequent pruning of nodes from the BVH traversal.

In some example implementations, to determine the ray direction sign information, the threads can each select the first ray among the multiple rays, or randomly select one of the multiple rays. More generally, the threads can select a uniform value for ray direction sign information by selecting the most common pattern of ray direction sign information (among the n rays), which can be a mode value (e.g., most common value, among the n rays, for the 3-bit combination of signs for three component directions for the respective rays) or component-wise majority sign (e.g., calculated using a majority vote among the n rays). This is a more computationally intensive way to determine the ray direction sign information, but it may more reliably finds ray direction sign information that is representative of the group, which in turn facilitates fast determination of good (close) intersections for the rays, and subsequent pruning of nodes from the BVH traversal.

IV. Examples of Non-Divergent Parallel BVH Traversal.

Figure 6A:
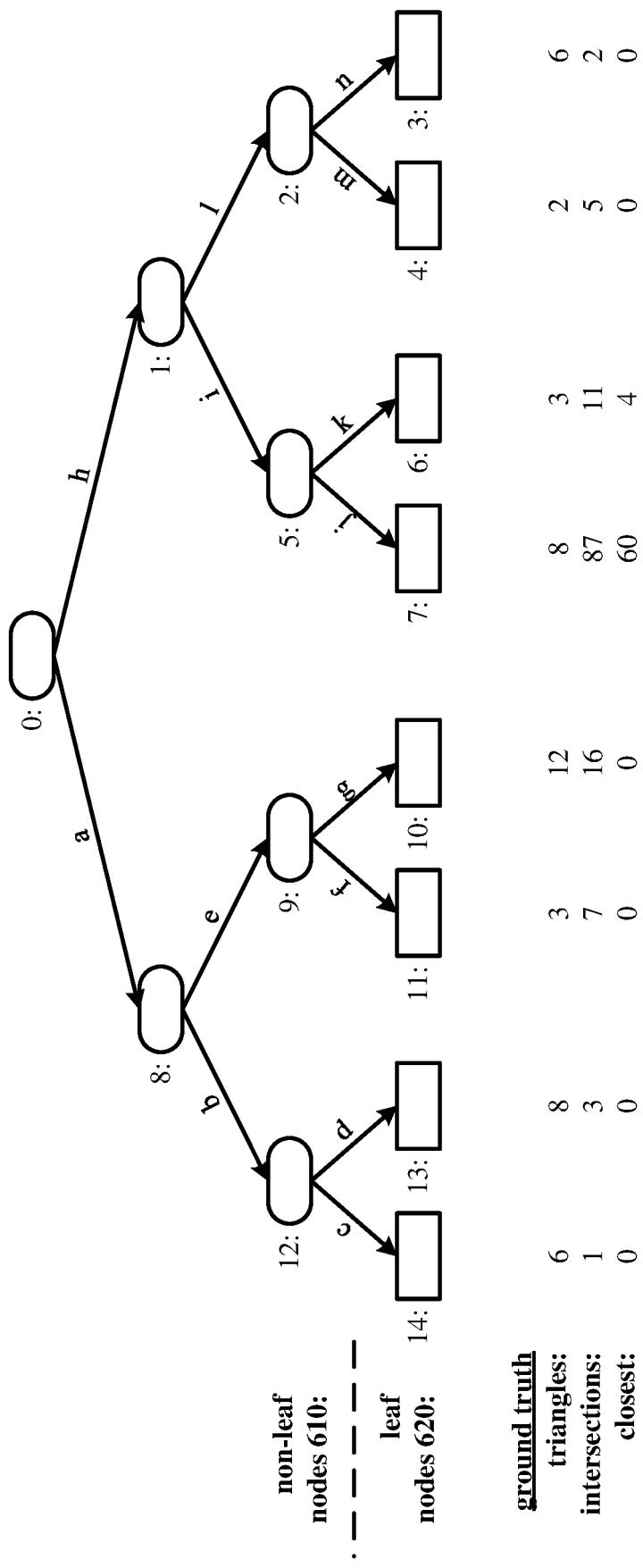
FIG. 6a is a diagram illustrating an example BVH to be traversed to find intersections for a group of 64 rays.

FIG. 6a shows a simplified example BVH (600) to be traversed to find intersections for a group of 64 rays. The BVH include three layers of non-leaf nodes (610) as well as a layer of leaf nodes (620) that enclose triangle data in bounding boxes. The BVH is organized as a binary tree, with nodes numbered 0 to 14. For the sake of explanation, branches from parent nodes to their respective left and right child nodes are labeled with letters, but such labels are not represented in code or data in practice.

For the sake of illustrating traversal operations, FIG. 6a also shows "ground truth" data for the BVH traversal operations. For each leaf node, FIG. 6a shows (a) the number of triangles enclosed in the leaf node, (b) the number of times any of the 64 rays intersects any of the enclosed triangles, and (c) the number of times one of those intersections is the leading (closest) intersection for a ray. In the example of FIG. 6a, each of the 64 rays intersects at least one of the enclosed triangles—the total number of leading (closest) intersections is 64. The leading intersections are clustered in two of the leaf nodes, with the bounding box for one of the leaf nodes containing the vast majority of the leading intersections. In the ground truth data, the number of possible intersections is much larger than 64. Thus, at least some of the 64 rays also intersect the enclosed triangles at further points, which might be actually evaluated or skipped, depending on the order of BVH traversal.

A. Example of Non-Divergent Parallel BVH Traversal Without Priority Scheduling of Nodes.

FIG. 6b is a listing (601) of actions during non-divergent parallel traversal operations of the BVH (600) without prioritized scheduling of nodes. Without prioritized scheduling, in this example, the left child node is always scheduled for evaluation earlier than the right child node. The actions are performed in parallel by a group of 64 threads of a processing unit (e.g., SIMD unit of a GPU), with order of BVH traversal synchronized between the threads.

To start, the threads evaluate node 0, loading the bounding box for node 0 and testing the bounding box for node 0. The threads continue evaluation (finding at least one promising intersection), and schedule nodes 1 and 8 for evaluation. The threads schedule node 8 for evaluation earlier than node 1 (e.g., pushing node indices for nodes 1 and 8 on a stack in that order, such that the node index for node 8 will be popped from the stack first.)

Following branch a, the threads next evaluate node 8, loading the bounding box for node 8 and testing the bounding box for node 8. The threads continue evaluation (finding at least one promising intersection), and schedule nodes 9 and 12 for evaluation. The threads schedule node 12 for evaluation earlier than node 9.

Following branch b, the threads next evaluate node 12, loading the bounding box for node 12 and testing the bounding box for node 12. The threads continue evaluation (finding at least one promising intersection), and schedule nodes 13 and 14 for evaluation. The threads schedule node 14 for evaluation earlier than node 13.

Following branch c, the threads next evaluate node 14, loading the bounding box for node 14 and testing the bounding box for node 14. The threads continue evaluation (finding at least one promising intersection), and perform leaf processing for intersections between the 64 rays and triangles in the bounding box for node 14. Since node 14 is a leaf node, there are no child nodes to schedule.

Following branch d, the threads next evaluate node 13, loading the bounding box for node 13 and testing the bounding box for node 13. The threads continue evaluation (finding at least one promising intersection), and perform leaf processing for intersections between the 64 rays and triangles in the bounding box for node 13. Since node 13 is a leaf node, there are no child nodes to schedule.

Similarly, the threads follow branches e, f, and g, in that order, and evaluate nodes 9, 11, and 10. This completes evaluation of nodes under node 8.

Next, following branch h, the threads evaluate node 1. The threads load the bounding box for node 1 and test the bounding box for node 1. The threads continue evaluation (finding at least one promising intersection), and schedule nodes 2 and 5 for evaluation. The threads schedule node 5 for evaluation earlier than node 2.

Following branch i, the threads next evaluate node 5, loading the bounding box for node 5 and testing the bounding box for node 5. The threads continue evaluation (finding at least one promising intersection), and schedule nodes 6 and 7 for evaluation. The threads schedule node 7 for evaluation earlier than node 6.

Following branch j, the threads next evaluate node 7, loading the bounding box for node 7 and testing the bounding box for node 7. The threads continue evaluation (finding at least one promising intersection), and perform leaf processing for intersections between the 64 rays and triangles in the bounding box for node 7. In doing so, the threads find many intersections, including 60 that ultimately (according to the ground truth) are the leading (closest) intersections. Since node 7 is a leaf node, there are no child nodes to schedule.

Following branch k, the threads next evaluate node 6, loading the bounding box for node 6 and testing the bounding box for node 6. The threads continue evaluation (finding at least one promising intersection), and perform leaf processing for intersections between the 64 rays and triangles in the bounding box for node 6. In doing so, the threads (according to the ground truth) find the rest of the leading (closest intersections.) Since node 6 is a leaf node, there are no child nodes to schedule.

Finally, following branch l, the threads evaluate node 2. The threads load the bounding box for node 2 and test the bounding box for node 2. The threads do not continue evaluation of node 2, after determining that the bounding box for node 2 includes no candidate triangles close enough to yield a closer intersection for any of the 64 rays. Thus, in the listing (601) shown in FIG. 6b, the threads can skip evaluation of nodes 3 and 4.

The threads can then stop the BVH traversal process for the 64 rays, since the last scheduled node has been evaluated. In the listing (601) shown in FIG. 6b, 13 of the 15 nodes are evaluated. Although there is some potential savings (since two nodes are pruned), many non-promising nodes are evaluated before reaching the two nodes that contain the triangles of interest.

B. Example of Non-Divergent Parallel BVH Traversal with Priority Scheduling of Nodes.

FIG. 6c is a listing (602) of actions during non-divergent parallel traversal operations of the BVH (600) with prioritized scheduling of nodes. As in the listing (601) of FIG. 6b, the actions are performed in parallel by a group of 64 threads of a processing unit (e.g., SIMD unit of a GPU), with order of BVH traversal synchronized between the threads. In scheduling left and right child nodes for BVH traversal, the threads use ray sign decision information to decide which of the child nodes is more likely to include leading (closest) intersections for the 64 rays.

To start, the threads evaluate node 0, loading the bounding box for node 0 and testing the bounding box for node 0. The threads continue evaluation (finding at least one promising intersection), and schedule nodes 1 and 8 for evaluation. Based on ray sign decision information that indicates node 1 is closer according to ray sign decision information, the threads schedule node 1 for evaluation earlier than node 8 (e.g., pushing node indices for nodes 8 and 1 on a stack in that order, such that the node index for node 1 will be popped from the stack first.)

Following branch h, the threads next evaluate node 1, loading the bounding box for node 1 and testing the bounding box for node 1. The threads continue evaluation (finding at least one promising intersection), and schedule nodes 2 and 5 for evaluation. Based on ray sign decision information that indicates node 5 is closer according to ray sign decision information, the threads schedule node 5 for evaluation earlier than node 2.

Following branch i, the threads next evaluate node 5, loading the bounding box for node 5 and testing the bounding box for node 5. The threads continue evaluation (finding at least one promising intersection), and schedule nodes 6 and 7 for evaluation. Based on ray sign decision information that indicates node 7 is closer according to ray sign decision information, the threads schedule node 7 for evaluation earlier than node 6.

Following branch j, the threads next evaluate node 7, loading the bounding box for node 7 and testing the bounding box for node 7. The threads continue evaluation (finding at least one promising intersection), and perform leaf processing for intersections between the 64 rays and triangles in the bounding box for node 7. In doing so, the threads find many intersections, including 60 that ultimately (according to the ground truth) are the leading (closest) intersections. Since node 7 is a leaf node, there are no child nodes to schedule.

Following branch k, the threads next evaluate node 6, loading the bounding box for node 6 and testing the bounding box for node 6. The threads continue evaluation (finding at least one promising intersection), and perform leaf processing for intersections between the 64 rays and triangles in the bounding box for node 6. In doing so, the threads (according to the ground truth) find the rest of the leading (closest intersections.) Since node 6 is a leaf node, there are no child nodes to schedule.

Next, following branch 1, the threads evaluate node 2. The threads load the bounding box for node 2 and test the bounding box for node 2. The threads do not continue evaluation of node 2, after determining that the bounding box for node 2 includes no candidate triangles close enough to yield a closer intersection for any of the 64 rays. Thus, in the listing (601) shown in FIG. 6*b*, the threads can skip evaluation of nodes 3 and 4.

Next, following branch a, the threads evaluate node 8. The threads load the bounding box for node 8 and test the bounding box for node 8. The threads do not continue evaluation of node 8, after determining that the bounding box for node 8 includes no candidate triangle close enough to yield a closer intersection for any of the 64 rays. Thus, in the listing (602) shown in FIG. 6*c*, the threads can also skip evaluation of nodes 9-14.

The threads can then stop the BVH traversal process for the 64 rays, since the last scheduled node has been evaluated. In the listing (602) shown in FIG. 6*c*, 7 of the 15 nodes are evaluated. There are significant savings, since many non-promising nodes are skipped after reaching the two nodes that contain the triangles of interest.

C. Evaluation of Non-Divergent Parallel BVH Traversal with Priority Scheduling of Nodes.

For a group of rays that is less coherent than the example shown in FIG. 6*a*, more nodes would likely be evaluated, perhaps 10 or 11 nodes. At some point, it may more efficient to use divergent parallel traversal operations for a group of rays that exhibit incoherency. For example, for the BVH (600) shown in FIG. 6*a*, according to a divergent parallel traversal approach, many processing threads will evaluate four nodes (from the root node to a leaf node) in parallel and find a good (close) intersection point. Often, many subsequent nodes may be avoided as not possibly including any triangle that is closer than the intersection point. In this case, the traversal may finish after evaluation of 7 nodes (pruning the minimum number of branches of the BVH (600) that have not been considered) or a few more nodes. Section VI describes examples of factors that can be considered when deciding whether to use non-divergent parallel traversal operations or divergent parallel traversal operations.

V. Example Implementations of Operations for Non-Divergent Parallel BVH Traversal.

FIGS. 7*a*-7*f* are code listings (701-706) for an example implementation of non-divergent parallel BVH traversal operations. The code listings (701-706) show code that can be compiled to run in parallel in threads of a processing unit (e.g., SIMD unit of a GPU). Specifically, in the example of FIGS. 7*a*-7*f*, the code can be compiled to run in parallel in a group of 64 threads of a processing unit. Each of the threads runs the instructions in lockstep for a different ray among a group of 64 rays.

The code listings (701, 702) of FIGS. 7*a* and 7*b* show the main routine, Traverse( ), which has five input parameters, two output parameters, and an input-output parameter. The first four input parameters (rayOrigin, rayDirection, rayInverseDirection, and reyOriginTimesRayInverseDirection) specify the ray being tested by the thread (given ray). With rayOrigin, the origin of the given ray can be specified as three coordinates in 3D space. With rayDirection, the direction of the given ray can be specified as a vector with three components in 3D space. The inverse of the given ray can be specified as a vector with three components in 3D space, and the given ray origin times the ray inverse direction can be specified by the parameter of that name. (Alternatively, the ray inverse direction and ray origin times the ray inverse direction can be computed inside the function.)

The final input parameter, GI, is a thread index. GI is used in the divergent parallel traversal operations (see below) but ignored in non-divergent parallel traversal operations. As explained below, for non-divergent parallel traversal operations, functions such as stack push and stack pop operations ignore GI.

The input-output parameter, resultT, tracks the distance from the origin of the given ray to the leading (closest) intersection found so far. Initially, resultT has a highest possible value (max float), which signifies that no intersection has been found. Thus, when the function Traverse( ) is called the first time, the value resultT is the maximum value, indicating that no intersection has been found yet. After that, resultT tracks the "current best" value for resultT for the given ray on an ongoing basis. If a better intersection is found, resultT is updated to have a lower value. The triangle that produces that minimum resultT value is the nearest triangle to the ray origin, and therefore is the first intersection along the given ray.

The output parameter resultBary indicates the intersection point in a triangle for the intersection. The output parameter resultTriId is an identifier for the triangle that is intersected.

The parameters resultT, resultBary, resultTriId, rayOrigin, rayDirection, rayInverseDirection, and rayOriginTimesRayInverseDirection are different for different rays. In the GPU architecture with 64 threads of a processing unit (e.g., SIMD unit), there are 64 sets of parameters for 64 different rays.

In the Traverse( ) function, the UNIFORM_TRAVERSAL_MODE switch selectively makes the traversal operations non-divergent. The code # if UNIFORM_TRAVERSAL_MODE is the start of a preprocessor directive, which defines operations that happen if UNIFORM_TRAVERSAL_MODE is true (1). The example code (701-706) shown in FIGS. 7a-7f can be used for non-divergent parallel traversal (when UNIFORM_TRAVERSAL_MODE is true (1)) or divergent parallel traversal (when UNIFORM_TRAVERSAL_MODE is false (not 1)). In some implementations, non-divergent parallel traversal (UNIFORM_TRAVERSAL_MODE is true (1)) is always used. In other implementations, non-divergent parallel traversal is selectively used for some types of rays (such as rays that are sufficiently coherent, or primary rays) but not for other types of rays (such as rays that are not sufficiently coherent, or secondary rays such as reflection rays, shadow rays, refraction rays, etc.) For such implementations, the code shown in FIGS. 7a-7f can be compiled twice (once with UNIFORM_TRAVERSAL_MODE being true, and once with UNIFORM_TRAVERSAL_MODE being false), and the appropriate code can be executed depending on the classification of a group of rays. Thus, in some example implementations, BVH traversal using non-divergent parallel traversal operations is selectively used.

In this section, the code in FIGS. 7a-7f is first explained for non-divergent parallel traversal operations (when UNIFORM_TRAVERSAL_MODE is true (1)). After that, differences are explained for divergent parallel traversal operations (when UNIFORM_TRAVERSAL_MODE is false (not 1)).

Whether performing non-divergent parallel traversal operations or divergent parallel traversal operations, each of the threads has the same set of instructions to execute. At any given time, each of the threads is either executing the same instruction (current instruction) or stalled (not executing any instruction).

A. Non-Divergent Parallel Traversal.

For non-divergent parallel traversal operations, many of the values processed by threads of a processing unit are the same for all threads that find intersections for a group of rays. A scalar value (also called a uniform value or non-divergent value) is the same for all threads that find intersections for a group of rays. In FIGS. 7a-7f, the uniform (scalar) values for non-divergent parallel traversal operations include values that apply for all rays (signBits, since raySign has been made uniform), traversal position or node tracking values (stackPointer, thisNodeIndex), information about the current node (box, flags, leftChildIndex, rightChildIndex), uniform decision values (the result of any (_Ballot64(test)), traverseRightFirst), and values of triangles tested for a leaf node (firstId, numTris, evenTris, id0, tridIds, triId0, v00, e00, e01, v10, e10, e11). In some cases, the uniform (scalar) value is set from an operation (such as ballot operation or other cross-group operation) that enforces uniformity for processing the group of rays. In other cases, the uniform (scalar) value is directly derived from a value set from an operation that enforces uniformity.

In other cases, a value is part of a vector of values (or, "vector value"). In this case, the value can be different for each different thread. The vector value includes one value per thread. Such a vector value may also be called a non-uniform or divergent value. In FIGS. 7a-7f, the non-uniform values include values that apply for an individual ray (rayOrigin, rayDirection, rayInverseDirection, rayOriginTimesRayInverseDirection, raySign/signBits for non-uniform traversal mode), values that indicate for an intersection for an individual ray (resultT, resultBary, resultTriId), a value that identifies the thread (GI, which is used in non-uniform mode), a value that indicates the result of the intersection test between the individual ray and bounding box (test), and the values that indicate the results of the intersection test between the individual ray and triangles (t0, t1, bary0, bary1)

With reference to FIG. 7a, the value raySign is set using calls to the function MajorityVote( ) which is shown in FIG. 7c. The value raySign includes a value for each of three dimensions x, y, and z in the environment. For each component, a thread checks the ray direction of the ray it is testing. If the direction of the ray is positive (rayDirection>0.0), the thread provides a Boolean value of true for the ray it is testing to the MajorityVote( ) function. Otherwise (rayDirection<=0.0), the thread provides a Boolean value of false for the ray is it testing.

As shown in FIG. 7c for the non-divergent traversal operations (when UNIFORM_TRAVERSAL_MODE is true (1)), the function MajorityVote accepts a vector of Boolean values as input. When called to set the value of raySign from the Traverse( ) function, the vector of Boolean values is 64 values resulting from the ray direction tests for the 64 rays, respectively. The function passes the vector of values (now represented with the vector variable vote) to the _Ballot64( ) operation, which returns a 64-bit value tally. The 64-bit value is a bit mask, including one bit per corresponding Boolean value in the input vector (0 if false; 1 if true). Thus, bits of the output bit mask are set for the lanes for which the input vector for _Ballot64( ) evaluates to true. Then, countbits(tally.x) returns the count of 1 bits in the first half of tally, and countbits(tally.y) returns the count of 1 bits in the second half of tally. If more than half of the input Boolean values were true (that is, if countbits(tally.x)+countbits(tally.y)>32), the function MajorityVote( ) returns true. Otherwise, the function MajorityVote( ) returns false.

Thus, for each of the x, y, and z components of ray direction, MajorityVote( ) is provided an input vector of Boolean values, and it returns a true or false value for that component. As shown in FIG. 7a, for each component, if the returned value is true, a corresponding bit in a value of raySign is set to 1. If the returned value is false, the corresponding bit in the value of raySign is 0. The values of raySign for the three components are then aggregated into a single value signBits, which thus provides a bit mask whose values at positions 26:24 indicate the majority-vote sign information for the z, y, and x components of the rays of a group. The three flag bits in signBits are used in later decisions about prioritized scheduling of child nodes for BVH traversal.

In this way, when non-divergent parallel traversal is used (UNIFORM_TRAVERSAL_MODE is true (1)), the value of signBits is made uniform for all threads. Alternatively, the value of signBits can be made uniform in some other way. For example, a function (used instead of MajorityVote( ) can select the sign bits of the first ray in a group. Or, the function can select the sign bits of a random ray in the group, so long as each thread picks the same ray for a given stage of BVH traversal. Or, the function can set a representative pattern of sign bits for the group of rays in some other way. In any case, setting signBits to have a uniform value forces all threads to prioritize child nodes in the same way during BVH traversal, as explained below.

In non-divergent parallel traversal operations, a stack is shared between all of the threads that traverse the BVH for a group of rays. The stack resides in shared memory—also called local data storage—that the threads can access quickly. All threads use one stack, which is initialized by setting the stack pointer to 0. Initially, the root node index (index 0) is pushed on the stack. (The GI value is ignored by the stack push and stack pop functions when UNIFORM_TRAVERSAL_MODE is true (1).) As seen in FIG. 7b, the exit condition for the BVH traversal is the stack pointer reaching zero at a specified check point.

FIG. 7d shows the stack being defined as a groupshared array of values. In some example implementations, the stack is on a scalar pipe. Node index values are pushed uniformly on the stack in all of the threads, since the same node index values are pushed by all threads in the same order.

FIG. 7d also shows stack push and stack pop operations for non-divergent parallel traversal operations. For non-divergent parallel traversal operations, the StackPush( ) function accepts as input the current stack pointer and node index value to pushed on the stack, adds the node index value to the top of the stack, and increments the stack pointer, which is returned as an output (inout) value. The StackPush2( ) function is a variation used when prioritized scheduling of two child nodes is used. The StackPush( ) function accepts as input the current stack pointer, two node index values, and a selector indicating which of the two node index values to push first. The StackPush2( ) function adds the two node index values in the indicated order and increments the stack pointer, which is returned as an output (inout) value. The two node index values can potentially be added to the stack with one write operation. The StackPop( ) function accepts as input the current stack pointer, retrieves the node index value at the top of the stack, decrements the stack pointer, which is returned as an output (inout value). The StackPop( ) function returns the retrieved node index value. For non-divergent parallel traversal operations, the StackPop( ) function makes the returned result (node index from the top of the stack) uniform for all threads.

Returning to FIG. 7a, in the main loop for BVH traversal, the current node is loaded by popping the node index at the top of the stack. This sets the variable thisNodeIndex, which is the same for all threads in non-divergent parallel traversal operations. Then, the bounding box and flags are retrieved for the current node. The bounding box and flags are scalar (uniform) values for all of the threads.

The variable box stores information about the bounding box for the current node in the BVH. The variable flags stores information about the current node. In example implementations, flags is a 32-bit value. The first bit (position 31) of flags indicates whether the current node is a leaf node or non-leaf node. For a non-leaf node, positions 30:27 are undefined. Positions 26:24 store sign bits for z, y, and x directions, respectively. A 1 indicates positive, and a 0 indicates negative. The remaining positions (23:0) store a node index of the left child node of the bounding box. The node index of the right child node is implied by the node index for the current node (which is the parent of the right child node). For a leaf node, positions 30:24 store the number of triangles in the bounding box for the leaf node.

The number of triangles can be 0 to 127, for example. The remaining positions (23:0) store an identifier of the first triangle in the bounding box for the leaf node. The identifiers of other triangles in the bounding box successively follow the identifier of the first triangle.

Each thread tests for an intersection between its ray and the bounding box for the current node. Thus, the different rays are tested (by different threads) against the same bounding box.

The ray-box intersection testing function depends on implementation. In general, the ray-box intersection testing function accepts parameters that specify the ray being tested as well as parameters that specify the bounding box. The ray-box intersection testing function returns a value of true if the ray being tested intersects the bounding box in a position of interest (specifically, a value of true is returned if the ray being tested intersects the bounding box at any point closer than the leading (closest) intersection found so far for the ray being tested). Otherwise, the ray-box intersection testing function returns a value of false. Since different threads test different rays, the result returned by the ray-box intersection testing function can vary among threads.

In FIG. 7a, the RayBoxTest( ) function accepts parameters resultT, rayOriginTimesRayInverseDirection, and rayInverseDirection, which specify the ray being tested. Alternatively, the ray being tested can be specified in some other way. The RayBoxTest( ) function also accepts parameters box.center and box.halfDim, which specify a center coordinate and dimension for sides of the bounding box. Alternatively, the bounding box can be specified in some other way, such as using parameters that indicate the coordinates of two corners of the bounding box (on opposite corners of the rectangular prism for the bounding box). The RayBoxTest( ) returns a Boolean value test for the ray. The ray may miss the bounding box completely, in which case no intersection is found (test is false). Or, the ray may intersect the bounding box in a position of interest (test is true).

More specifically, the function RayBoxTest checks for an intersection of a ray in the inverse direction of the ray being tested, starting from a point at the leading intersection so far (indicated by resultT) and projecting back to the origin of the ray. The function checks whether the inverse ray intersects the bounding box. If a good intersection has already been found, which is close to the ray origin (low value of resultT), the individual ray might not intersect the bounding box between the ray origin and the leading intersection so far (as indicated by resultT), in which can no intersection is found (for the inverse ray, and for the ray being tested), even though the ray being tested might intersect the bounding box if it traveled past the leading intersection so far.

In FIG. 7a, the variable test is a vector of Boolean values, which are the results of the ray-box intersection testing function for the 64 different rays, respectively. Depending on the value of test, further node evaluation operations are selectively performed to (a) evaluate whether the current node is a leaf node, and (b) perform ray-triangle intersection testing if the current node is a leaf node or schedule child nodes for subsequent traversal if the current node is a non-leaf node. For non-divergent parallel traversal operations, the value of the vector variable test is collectively evaluated for all of the threads. All threads either perform or skip the further node evaluation operations. In this way, the threads remain synchronized in their order of traversing the BVH.

More specifically, as shown in FIG. 7b, for non-divergent parallel traversal operations (for the branch when UNI- FORM_TRAVERSAL_MODE is true (1)), the vector variable test is input to _Ballot64( ). The operation _Ballot64 (input) is an example of a cross-group operation. For an input vector of 64 Boolean values, the _Ballot64(input) operation returns a single 64-bit value, which includes 1 bit in a corresponding position for each of the 64 Boolean values of the input vector. That is, the output value includes a bit in position 0 for the first Boolean value of the input vector, a bit in position 1 for the second Boolean value of the input vector, and so on. The bit is 1 if the corresponding Boolean value is true, and the bit is 0 if the corresponding Boolean value is false.

The function any(input) returns true if the input value is non-zero. Otherwise, the function any(input) returns false. In FIG. 7b, the function call any(_Ballot(64(test)) returns true if any of the bits of the output value is 1, which is the case if any of the values of the vector variable test is true. Otherwise, the function call any(_Ballot64(test)) returns false. All 64 threads get the same result from the function call any(_Ballot(64(test)). Thus, if any of the ray-box intersection tests returns a value of true, then the function call any(_Ballot(64(test)) returns true for all of the threads. Otherwise (each of the ray-box intersection tests returns a value of false), then the function call any(_Ballot(64(test)) returns false for all of the threads. In this way, all of the threads remain synchronized in their order of traversal of the BVH.

If the result of any(_Ballot(64(test)) indicates further node evaluation operations are to be performed for the current node (because at least one ray may intersect a closer triangle in the bounding box of the current node), then the flags of the current node are checked. Specifically, the first bit of the flags is checked with a bit-masking operation. For a 32-bit value of flags, the operation (flags & 80000000) returns true (1) is the current node is a leaf node, and otherwise returns false (0).

1. Leaf Node Processing.

If the current node is a leaf node, a thread performs operations to test for intersections between the individual ray being tested and the respective triangles in the bounding box. The number of triangles in the bounding box (numTris) and identifier of first triangle (firstId) are retrieved from the flags of the current node. The number of triangles is indicated at positions 30:24 of the flags, and the identifier of the first triangle is indicated at positions 23:0 of the flags.

Each triangle can be checked on a triangle-after-triangle basis, loading data for one triangle and testing, then loading data for the next triangle and testing it, and so on. Or, to take advantage of concurrent operations, multiple triangles can be checked at once, loading data for a set of triangles and testing them, then repeating for the next set of triangles. For example, as shown in FIGS. 7e and 7f, pairs of triangles can be tested concurrently, pair-after-pair. For an odd number of triangles, the last triangle is then tested.

For each pair of triangles, the current triangle identifier (id0) is set based on the identifier of the first triangle (firstId) of the leaf node and a counter. Corresponding triangle index values (two parts of triIds) are retrieved using the function BVHReadTwoTriangleIndices(id0), which maps the current triangle identifier (and next value) to corresponding triangle index values (triIds.x and triIDs.y, as the two parts of triIds). For each of the two triangles, vertex and edge values defining the triangle are retrieved using the function BVHReadTriangle. For each of the two triangles, the function RayTriangleIntersectEdge determines whether there is an intersection between the ray being tested and the triangle. If an intersection is found between the ray being tested and the triangle, the distance value returned by the function (t0 or t1) is less than the maximum possible value (the maximum possible value indicates no intersection), and barymetric coordinates (bary0 or bary1) for the intersection have valid values. For each of the triangles, the returned distance (t0 or t1) is compared to the distance for the leading intersection so far (resultT). If the returned distance is shorter, the parameters that track the intersection coordinates, distance, and triangle identifier for the leading intersection (resultBary, resultT, resultTriId) are updated to be the returned coordinates (bary0.xy or bary1.xy), returned distance (t0 or t1), and triangle identifier (id0 or id0+1), respectively.

Similarly, for the last triangle, the current triangle identifier (id0) is set based on the identifier of the first triangle (firstId) of the leaf node and a counter. The corresponding triangle index value (triId0) is retrieved using the function BVHReadTriangleIndex(id0), which maps the current triangle identifier to the corresponding triangle index value (triId0). Vertex and edge values defining the triangle are retrieved using the function BVHReadTriangle. The function RayTriangleIntersectEdge determines whether there is an intersection between the ray being tested and the triangle. If there is an intersection between the ray being tested and the triangle, the distance value returned by the function (t0) is less than the maximum possible value (the maximum possible value indicates no intersection), and barymetric coordinates (bary0) for the intersection have valid values. The returned distance (t0) is compared to the distance for the leading intersection so far (resultT). If the returned distance is shorter, the parameters that track the intersection coordinates, distance, and triangle identifier for the leading intersection (resultBary, resultT, resultTriId) are updated to be the returned coordinates (bary0.xy), returned distance (t0), and triangle identifier (id0), respectively.

The function RayTriangleIntersectEdge depends on implementation. For example, the function uses a variation of the Moller-Trumbore algorithm. Alternatively, the function uses another algorithm to check for an intersection between the ray being tested and triangle, returning coordinates for the intersection, if any, and distance to the intersection, if any. The triangle passed to the function can be parameterized as a vertex and two edges (as shown in FIGS. 7e and 7f), as three vertices, or in some other way.

During non-divergent parallel traversal operations, each of the threads checks the same triangle(s) concurrently, albeit against different rays. That is, each of the threads loads the same triangle information concurrently, which reduces the amount of information that is loaded and stored, and reduces memory usage.

2. Non-Leaf Node Processing.

Returning to FIG. 7b, if the current node is not a leaf node, a thread performs operations to schedule additional nodes for BVH traversal operations. In example implementations, the BVH is a binary tree. Each non-leaf node as two child nodes, which are designated left child node and right child node. The thread determines the left child index from the lower 24 bits of the flags value. The right child index is the index of the current node (thisNodeIndex) plus 1.

The thread next decides whether to prioritize the left child node or right child node for subsequent traversal of the BVH. Specifically, the thread evaluates the signBits (previously determined as uniform value for the rays of the group) and the corresponding values in the flags for the bounding box of the current node. The value traverseRightFirst is a Boolean value set equal to (signBits & flags) !=0. signBits & flags returns a non-zero value if any value of 1 in signBits matches a corresponding value of 1 in the flags. If this happens, the Boolean value is true.

For non-divergent parallel traversal operations, since the value of signBits is the same for all threads (as a result of earlier processing to make signBits uniform for all rays), the decision about prioritizing the left child node or right child node for subsequent traversal is the same for all of the threads. If the left child node is prioritized (evaluated sooner), the right child node index is pushed on the stack before the left child node index, so that the left child node index will be popped from the stack earlier. On the other hand, if the right child node is prioritized (evaluated sooner), the left child node index is pushed on the stack before the right child node index, so that the right child node index will be popped from the stack earlier.

Thus, in example implementations in which signBits is made uniform according to a "majority vote" criterion or other criterion, the order of pushing child node index values on the stack depends on which sign is most popular among the rays, as indicated by traverseRightFirst. This can lead to more efficient traversal of the BVH for several reasons, which in general relate to the BVH traversal finding "good" (close) intersections earlier in the traversal process. First, when good (close) intersections are found early in the traversal process for rays and tracked as the leading intersections, it is more likely that a later bounding box will fail the ray-box intersection test for the rays, which effectively stops further evaluation of that bounding box and avoids traversal within that bounding box. Second, and less significantly, when good (close) intersection are found early in the traversal process for rays and tracked as the leading intersections, operations in the leaf node processing stage to update the leading intersections (update distance, coordinates, triangle ID, etc.) are more likely to be skipped for all rays, since the closest distance has been quickly found. Stated differently, by prioritizing child nodes that are promising when traversing the BVH, smaller values of resultT tend to be found earlier, such that subsequent operations can be pruned.

B. Divergent Parallel Traversal Operations.

When divergent parallel traversal operations are performed (if UNIFORM_TRAVERSAL_MODE is false (not 1)), various values that are uniform (scalar, non-divergent) for non-divergent parallel traversal are instead independently set and evaluated in different threads. This includes values that apply for individual rays (signBits), traversal position and node tracking values (stackPointer, thisNodeIndex), information about the current node (box, flags, leftChildIndex, rightChildIndex), decision values (test, traverseRightFirst), and values of triangles tested for a leaf node (firstId, numTris, evenTris, id0, tridIds, triId0, v00, e00, e01, v10, e10, e11).

Specifically, in divergent parallel traversal operations, each thread keeps the values of raySign for components of ray direction for its ray, and assigns signBits based on the component raySign values for its ray. During later BVH traversal operations, this can result in different prioritization of child nodes for different threads.

In divergent parallel traversal operations, each of the threads uses a different stack, which is associated with the thread index (GI) for that thread. In a stack push function, a node index is pushed on the stack associated with the value of GI passed to the stack push function. In the stack pop function, a node index is popped from the stack associated with the value of GI passed to the stack pop function. The stack can reside in local memory for the thread. As in non-divergent parallel traversal operations, the stack is initialized by setting the stack pointer to 0, the root node index (index 0) is initially pushed on the stack, and the exit condition for the BVH traversal is the stack pointer reaching zero at a specified check point. During traversal operations, however, different threads may traverse nodes of the BVH in different orders, potentially following different paths through the BVH.

In particular, for divergent parallel traversal operations (for the branch of preprocessor directive when UNIFORM_TRAVERSAL_MODE is false (not 1)), after the value of the variable test is separately determined for each of the threads, no uniform result is determined for the threads for a group of rays. Instead, depending on the value of test returned for its ray, each thread performs or skips further node evaluation operations to (a) evaluate whether the current node is a leaf node and (b) perform (or wait for) ray-triangle intersection testing if the current node is a leaf node or schedule child nodes for subsequent traversal if the current node is a non-leaf node. In this way, different threads may diverge in their order of traversing the BVH.

With respect to leaf node processing operations, if the current node is a leaf node, a thread checks the triangles in the bounding box of the leaf node. Because different threads may evaluate different nodes concurrently, different threads may load different triangle information, which uses more memory.

With respect to non-leaf node processing operations, if the current node is not a leaf node, the thread performs operations to schedule additional nodes for BVH traversal operations. The thread determines the left child index from the lower 24 bits of the flags value. The right child index is the index of the current node (thisNodeIndex) plus 1. The thread next decides whether to prioritize the left child or right child for subsequent traversal of the BVH. Specifically, the thread evaluates the signBits for its ray and the corresponding values in the flags for the bounding box of the current node. Again, the value traverseRightFirst is a Boolean value set equal to (signBits & flags) !=0. For divergent parallel traversal operations, since the value of signBits is potentially different for different threads, the decision about prioritizing the left child or right child for subsequent traversal can be different for different threads. In this way, different threads may further diverge in their order of traversing the BVH.

C. Alternatives and Variations for Example Operations.

In the code listings of FIGS. 7a-7f, the BVH is a binary tree. Alternatively, the BVH can be a quad tree, oct tree, or hierarchy organized in some other way.

In the code listings of FIGS. 7a-7f, the geometric objects enclosed in the BVH are triangles. Alternatively, the BVH can enclose at least one other type of geometric object.

As noted, the ray-triangle intersection testing function can implement the Moller-Trumbore algorithm or another algorithm to detect an intersection between a ray and triangle.

In the code listings of FIGS. 7a-7f, threads use prioritized scheduling to order child nodes for subsequent traversal operations (setting values for signBits, comparing signBits to corresponding values in flags, etc.). Alternatively, non-divergent parallel traversal operations can be performed without using prioritized scheduling. In other words, child nodes can be traversed in a pre-defined order. If rays are sufficiently coherent, there are still instances in which performance is improved by finding good (close) intersections quickly, which leads to pruning of subsequent nodes.

VI. Examples Approaches for Selective Use of Non-Divergent Parallel BVH Traversal.

Non-divergent parallel BVH traversal operations tend to be efficient when a group of rays is coherent. When rays are coherent (have similar directions), non-divergent parallel BVH operations tend to find good (close) intersections quickly for the whole group of rays, which results of pruning of a significant proportion of the nodes of the BVH. On the other hand, non-divergent parallel BVH traversal operations tend to be less efficient when a group of rays is not coherent. When rays are not coherent (have dissimilar directions), the non-divergent parallel BVH operations have trouble finding good (close) intersections quickly for the whole group of rays, which results of traversal of a significant proportion of the nodes of the BVH.

In general, primary rays, which originate from a virtual camera or other viewing point in a computer-represented environment, tend to be coherent, at least when the primary rays are associated with pixels of a small spatial region of an image or are otherwise grouped in the image through which they pass. In contrast, higher-order rays (such as secondary rays, tertiary rays, etc.), which may be reflected rays, refracted rays, shadow rays, or diffuse rays, for example, tend to be less coherent due to scattering, reflection from non-uniform surfaces, and other effects. As such, a heuristic for the coherence of a group of rays can depend on (a) whether the rays are primary rays, and (b) if the rays are primary rays, whether the rays are grouped in the image through which they pass (e.g., are associated with a small spatial region). The heuristic can then be used to select between using non-divergent parallel traversal operations and divergent parallel traversal operations for the group of rays.

Or, a heuristic for the coherence of a group of rays can directly evaluate the ray directions and ray origins for the rays of the group. For rays having the same origin, for example, the heuristic can consider how closely grouped the directions of the rays are, which can be measured in terms of deviation from a mean ray, density, or some other metric. The heuristic can then be used to select between using non-divergent parallel traversal operations and divergent parallel traversal operations for the group of rays.

Or, to select between using non-divergent parallel traversal operations and divergent parallel traversal operations, cost values can be calculated for the two options. For a group of rays, the cost value for non-divergent parallel traversal operations can depend on the length of the path traveled in the traversal operations, which relates to the number of nodes evaluated. The cost value may also depend on how many leaf nodes are processed. For the group of rays, the cost value for divergent parallel traversal operations, in which the BVH may be traversed in a non-synchronized way for different rays, can depend on the cost of traversing the BVH for the most "expensive" ray, which is the ray for which the traversal takes the longest time to find the leading intersection.

Figure 8:
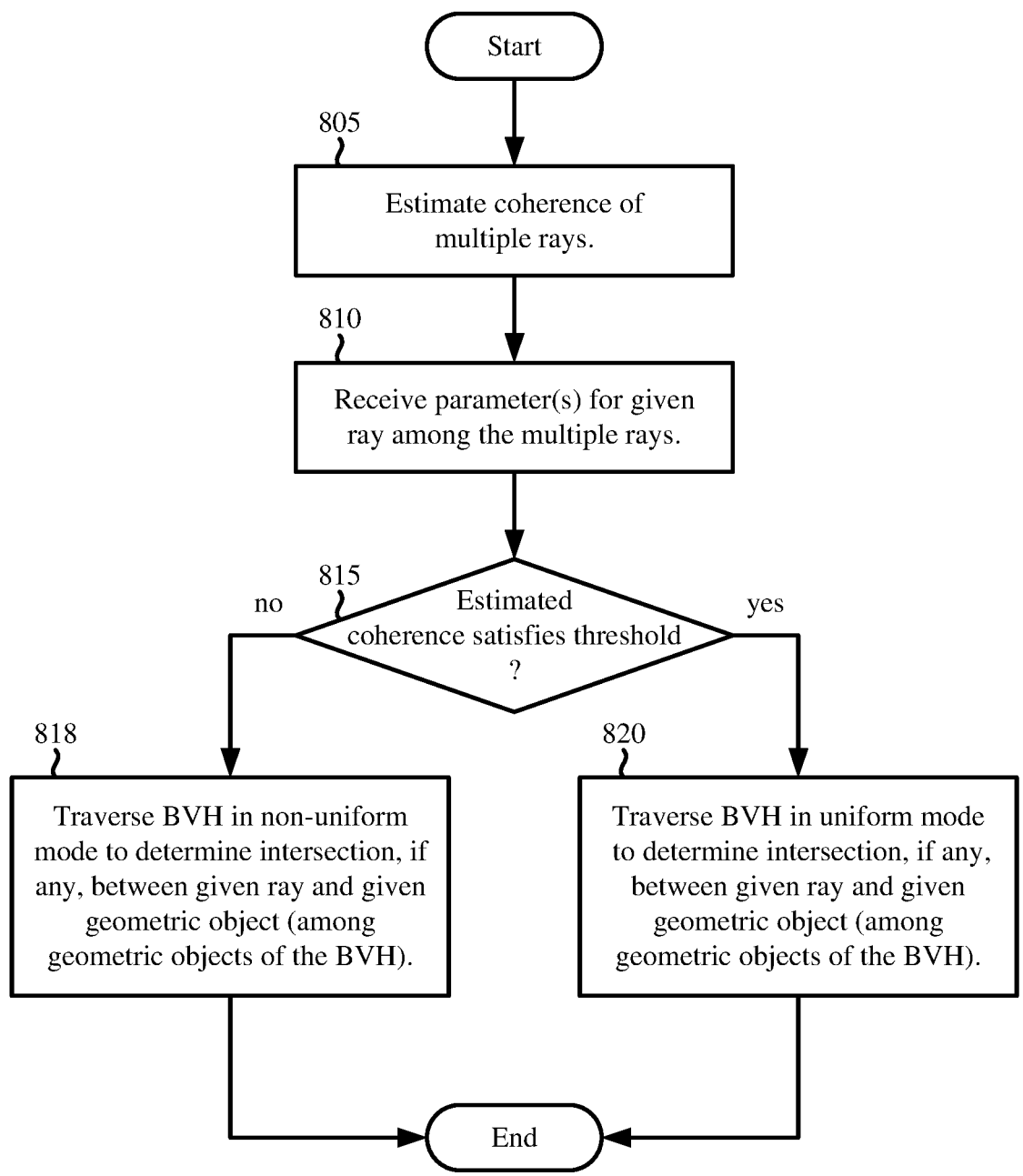
FIG. 8 is flowchart illustrating a generalized technique for selectively performing non-divergent parallel traversal operations or divergent parallel traversal operations for BVH traversal depending on whether rays are sufficiently coherent.

FIG. 8 shows a generalized technique (800) for selectively performing non-divergent parallel traversal operations or divergent parallel traversal operations for BVH traversal depending on whether rays are sufficiently coherent. The technique (800) can be performed, for example, by processing units of a computer system that implements a ray tracing tool. The computer system includes a processing unit with threads that execute to perform ray tracing for multiple rays of a group in parallel in a computer-represented environment. The environment includes multiple geometric objects enclosed in a BVH.

To start, the coherence of the multiple rays of the group is estimated (805). For example, the coherence of the rays is estimated based at least in part on (a) spatial density of the rays, (b) deviation of the rays from a mean ray, and/or (c) whether the rays are primary rays. Alternatively, the coherence of the rays is estimated based at least in part on other and/or additional factors.

The threads that participate in the BVH traversal receive (810) parameters for the multiple rays of the group. The parameters for the multiple rays include one or more parameters for a given ray among the multiple rays. For example, the parameters of the rays are parameters as described in section V or other parameters.

The threads that participate in the BVH traversal, or one or more other threads, determine (815) whether the estimated coherence of the multiple rays satisfies a threshold. The threshold depends on the factors used to estimate coherence. The threshold can be a condition (e.g., rays are primary ray for a small spatial region). Or, the threshold can be numerical (e.g., a value of density or deviation from a mean ray, which can be set based on experimental results).

If the estimated coherence of the multiple rays satisfies the threshold, the threads traverse (820) the BVH in a uniform traversal mode to determine intersections, if any, between the rays, respectively, of the group and one or more of the geometric objects of the BVH. The uniform traversal mode uses non-divergent parallel traversal operations, as described previously. Otherwise (the estimated coherence of the multiple rays does not satisfy the threshold), the threads traverse (818) the BVH in a non-uniform traversal mode to determine the intersections, if any, between the rays, respectively, and one or more of the geometric objects of the BVH. The non-uniform traversal mode uses divergent parallel traversal operations, as described previously.

VII. Alternatives and Variations

This section describes several alternatives and variations for the innovations presented herein.

A. Examples of Selective Performance of Non-Divergent Parallel BVH Traversal.

In the preceding examples, BVH traversal operations are performed in parallel for a group of rays using multiple threads. In this way, ray tracing operations can be performed for all pixels of an image on a group-after-group basis. Or, ray tracing operations can be performed selectively for a subset of the pixels of an image, using another (computationally simpler) approach to render other pixels of the image. Thus, non-divergent parallel BVH traversal can be performed for all of the rays of an image or for a subset of rays in an image.

B. Examples of Switching BVH Traversal Modes within a Group of Rays.

In some of the preceding examples, if a group of rays is deemed to be coherent, BVH traversal operations are performed in parallel for the group of rays in a uniform traversal mode (with non-divergent parallel traversal operations). On the other hand, if the group of rays is deemed to be non-coherent, BVH traversal operations are performed in parallel for the group of rays in a non-uniform traversal mode (with divergent parallel traversal operations). Alternatively, BVH traversal operations can switch between uniform traversal mode and non-uniform traversal mode during BVH traversal for a group of rays. For example, BVH traversal can start in the uniform traversal mode to find intersections, if any, for some (coherent) rays of a group then switch to the non-uniform traversal mode to find intersections, if any, for the remaining (non-coherent) rays of the group.

Uniform traversal mode (with non-divergent parallel traversal operations) tends to work quickly for rays that are coherent, or at least mostly coherent. For non-coherent rays, however, uniform traversal mode can be slower than non-uniform traversal mode (with divergent parallel traversal operations). For non-coherent rays, traversing a BVH in uniform traversal mode may visit so many nodes of the BVH that traversing the BVH in non-uniform traversal mode would be faster (that is, have fewer iterations), even considering the inefficiencies (such as idle threads) of the non-uniform traversal mode.

In typical scenarios that use uniform traversal mode for a group of rays, BVH traversal operations can be temporally partitioned into two phases of effectiveness. In the first phase, which takes approximately 50-90% of the time, correct results are found for approximately 70-90% of the rays. After that, in the second phase, correct results are found for the remaining rays. In many cases, BVH traversal operations in the second phase are inefficient, since the remaining rays are relatively non-coherent compared to the rays handled in the first phase.

To address such inefficiencies, BVH traversal operations can switch from uniform traversal mode to non-uniform traversal mode partway through the BVH traversal operations for a group of rays. This can help the BVH traversal operations finish faster for any remaining, non-coherent rays of a group of rays. For example, after a threshold period of time or threshold number of iterations of traversing the BVH in uniform traversal mode (with the order of traversal of the BVH being synchronized between threads for multiple rays), each of the threads can switch to traversing the BVH in a non-uniform traversal mode to determine the intersection, if any, between the given ray for that thread and one of the multiple geometric objects of the BVH. After switching to the non-uniform traversal mode, the order of traversal of the BVH is no longer synchronized between the threads for the multiple rays, respectively. The threshold number of iterations depends on implementation. For example, the threshold number of iterations is 8 iterations, 12 iterations, 20 iterations, or some other number of iterations. The threshold number of iterations can depend on the depth of the BVH. For example, the threshold number of iterations is larger for a BVH with more layers of nodes.

C. Examples of Threshold Voting Rules and Recovery Operations.

In general, when traversing a BVH in uniform traversal mode, a cross-group operation is used to synchronize traversal between threads for rays of a group. In some of the preceding examples, the cross-group operation is a ballot operation for which each of threads provides one vote, for the ray that the thread is evaluating, based on the result of an intersection test for the ray and a bounding volume. If any of the intersection tests indicates the bounding volume may include a new intersection that is closer than a leading intersection for its tested ray, then all of the threads continue traversal operations within that bounding volume. For example, as shown in FIG. 7b, the function call any(_Ballot (64(test)) returns true if any of the bits of the output value is 1, which is the case if any of the values of the vector variable test is true. In this way, the threads remain synchronized in their order of traversal of the BVH in uniform traversal mode. When rays of a group are non-coherent, however, BVH traversal in uniform traversal mode may visit nodes that are unlikely to lead to intersections for most rays. For example, when a BVH is traversed in uniform traversal mode, a node may be visited because a single ray (out of 64 rays or some other number of rays in the group) might intersect a geometric object in the bounding volume associated with that node.

To mitigate such inefficiencies, instead of switching to a non-uniform traversal mode (as described in the previous section), a threshold-vote cross-group operation can be used in order to synchronize traversal of a BVH between threads for rays, respectively. The cross-group operation can be a ballot operation for which each of threads provides one vote, for the ray that the thread is evaluating, based on the result of an intersection test for the ray and a bounding volume. Unlike previous examples, BVH traversal includes determining, based on results of the cross-group operation, whether a bounding volume may include, for at least a threshold number of the multiple rays, any new intersection closer than a leading intersection for that ray. In other words, if at least a threshold number of the intersection tests indicate the bounding volume may include a new intersection that is closer than a leading intersection for its tested ray, then all of the threads continue traversal operations within that bounding volume. If the count of positive results from the intersection tests is at least the threshold number, then all of the threads continue traversal operations within the bounding volume. On the other hand, if the count of positive results from the intersection tests is less than the threshold number, then all of the threads skip the bounding volume. In this way, "outlier" positive results from the intersection tests are ignored in the synchronized BVH traversal decisions. The threshold number depends on implementation. For example, the threshold number is 2, 4, or some other number. The threshold number can be pre-defined, or the threshold number can change dynamically depending on available resources or a quality setting. With the threshold-vote cross-group operation, when rays of a group are non-coherent, synchronized BVH traversal skips nodes that can, at most, lead to intersections for a small number of rays (less than the threshold number).

In some example implementations, the threshold-vote cross-group operation is implemented as follows. The variable test is a vector of Boolean values, which are the results of a ray-box intersection testing function for 64 different rays, respectively. In uniform traversal mode, the variable test is input to the function call threshold(_Ballot64(test)). As explained in section V.A, _Ballot64( ) is an example of a cross-group operation. For an input vector of 64 Boolean values, the _Ballot64(input) operation returns a single 64-bit value. The 64-bit value returned by _Ballot64(test) is a bit mask of intersection test results, which includes 1 bit in a corresponding position for each of the 64 Boolean values of the input vector test. The bit is 1 if the corresponding Boolean value is true, and the bit is 0 if the corresponding Boolean value is false.

The function call threshold(input) returns true if a threshold number of bits of the input bit mask are 1. Otherwise, the function call threshold(input) returns false. For example, threshold(input) determines the number of 1 bits in the input using countbits( ) operations, then compares the number of 1 bits to a threshold number.

Thus, the function call threshold(_Ballot64(test)) returns true if a threshold number of bits of the bit mask of intersection test results are 1. Otherwise, the function call threshold(_Ballot64(test)) returns false. All 64 threads get the same result from the function call threshold(_Ballot64 (test)). If at least the threshold number of the ray-box intersection tests return a value of true, then the function call threshold(_Ballot64(test)) returns true for all of the threads. Otherwise, the function call threshold(_Ballot64(test)) returns false for all of the threads. In this way, all of the threads remain synchronized in their order of traversal of the BVH.

When a threshold-vote cross-group operation is used to synchronize BVH traversal operations between threads, the results of BVH traversal may be incorrect for some rays. For example, suppose a bounding volume is skipped because the bounding volume includes geometric objects that intersect, at most, a small number of rays (less than the threshold number). The results of BVH traversal may be wrong for a ray whose vote to continue BVH traversal within the skipped bounding volume was "ignored" in the threshold-vote cross-group operation. The ray whose vote was ignored may traverse a path through the BVH that never encounters the closest geometric object that the ray intersects. As a result, the ray may (incorrectly) miss all geometric objects in the BVH or intersect the wrong geometric object (one that is further away than the correct, closest geometric object) in the BVH. Thus, BVH traversal in uniform traversal mode with a threshold-vote cross-group operation is potentially lossy.

Threads can perform additional operations to compensate for (clean up, cover up, recover from, etc.) the loss of correct results when a threshold-vote cross-group operation is used to synchronize BVH traversal operations. A thread can track when the vote of the thread for a given ray is ignored in the threshold-vote cross-group operation. After BVH traversal, the thread can determine a confidence score for the given ray. In general, the confidence score is based at least in part on how many times the vote for the thread was ignored as being less than the threshold number. For example, if a thread votes for a ray to continue BVH traversal within a bounding volume but the vote is "ignored" (the bounding volume is skipped), a counter for the ray is incremented. The counter for the ray is an example of a confidence score. If the vote for the ray is ignored one time, the value of the counter is one. If the vote for the ray is ignored five times, the value of the counter is five, and so on. Alternatively, a confidence score can be tracked in some other way.

If the confidence score for the given ray fails a confidence threshold, the thread adjusts the result for the given ray using the results of BVH traversal for one or more surrounding rays that satisfy the confidence threshold. For example, the thread can assign one or more parameters that represent the intersection, if any, between the given ray and one of the multiple geometric objects of the BVH based on results of the BVH traversal for the surrounding ray(s) that satisfy the confidence threshold. The confidence threshold depends on implementation. For example, the confidence threshold is one, two, or some other number. In this way, the results for rays ignored in the threshold-vote cross-group operation can be adjusted, so as to de-prioritize the results for the rays that have been ignored and blend them with the good results of surrounding rays.

In some example implementations, using a threshold-vote cross-group operation with a threshold number of four can speed up BVH traversal operations by a factor of two or more, which is significant for real-time applications. Additional operations to compensate for the loss of correct results can be performed relatively quickly and without significant, noticeable defects.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computer system having multiple processing units, a method of ray tracing multiple rays in parallel in a computer-represented environment that includes multiple geometric objects enclosed in a bounding volume hierarchy ("BVH"), the method comprising, with each of multiple threads of one the multiple processing units:
   receiving one or more parameters for a given ray among the multiple rays;
   traversing the BVH to determine an intersection, if any, between the given ray and a given geometric object among the multiple geometric objects of the BVH, wherein order of traversal of nodes of the BVH is synchronized between the multiple threads for the multiple rays, respectively, using a ballot operation for which each of the multiple threads provides one vote, wherein the traversing includes determining, based on results of the ballot operation, whether a bounding volume may include, for at least a threshold number of the multiple rays, any new intersection closer than a leading intersection for the multiple rays, respectively;
   determining, based at least in part on how many times the vote for the given ray was ignored during the traversing, a confidence score for the given ray; and
   if the confidence score for the given ray fails a confidence threshold, assigning one or more parameters that represent the intersection, if any, between the given ray and one of the multiple geometric objects of the BVH based on results of the traversing for one or more surrounding rays that satisfy the confidence threshold.

2. The method of claim 1, wherein the traversing includes, in each of multiple iterations:
   loading a bounding volume for a given node among the nodes of the BVH;
   for the given ray, testing the bounding volume for the given node; and
   determining whether to continue the traversing within the bounding volume for the given node and, if so:
      determining whether the given node is a leaf node;
      if the given node is a leaf node, testing whether the given ray intersects those of the multiple geometric objects that are in the bounding volume for the given node; and
      if the given node is not a leaf node, scheduling multiple child nodes of the given node for subsequent traversal, as the given node, in later ones of the multiple iterations.

3. The method of claim 2, wherein the testing the bounding volume for the given node includes checking whether the bounding volume for the given node may include any new intersection closer than the leading intersection for the given ray.

4. The method of claim 1, wherein:
   the one or more parameters for the given ray include (a) an origin of the given ray, (b) a direction of the given ray, (c) a distance to the leading intersection for the given ray, (d) an inverse direction of the given ray, and/or (e) the origin of the given ray times the inverse direction of the given ray; and
   after the traversing, the one or more parameters that represent the intersection, if any, between the given ray and an intersected geometric object of the BVH, include (a) an identifier of the intersected geometric object, (b) coordinates of the intersection within the intersected geometric object, and/or (c) a distance to the intersection.

5. The method of claim 1, wherein the multiple geometric objects are triangles.

6. The method of claim 1, wherein the nodes of the BVH include multiple leaf nodes and one or more non-leaf nodes, each of the multiple leaf nodes including one or more of the multiple geometric objects, wherein each of the multiple leaf nodes represents a bounding volume around the one or more geometric objects of that leaf node, and wherein each of the one or more non-leaf nodes represents a bounding volume around one or more of the multiple leaf nodes or other non-leaf nodes.

7. The method of claim 1, wherein the traversing uses stack push operations and stack pop operations on a shared stack to track position within the BVH, and wherein the shared stack is maintained in memory accessible to the multiple threads.

8. The method of claim 1, wherein the multiple processing units are single-instruction, multiple data ("SIMD") units of a graphics processing unit, and wherein the multiple threads are elements of one of the SIMD units.

9. The method of claim 1, wherein the multiple threads include n threads that, collectively, determine intersections, in any, for a group of n rays as the multiple rays.

10. The method of claim 1, further comprising:
for each of one or more dimensions of the computer-represented environment, determining ray direction sign information; and
as part of the traversing, using the ray direction sign information to prioritize the nodes in the BVH.

11. The method of claim 10, wherein the determining the ray direction sign information uses a majority vote among the multiple rays or randomly selects one of the multiple rays.

12. The method of claim 1, wherein the traversing the BVH with the order of traversal of the nodes of the BVH being synchronized is part of a uniform traversal mode, and wherein the method further comprises, after a threshold period of time or threshold number of iterations of the traversing the BVH in the uniform traversal mode, with each of the multiple threads:
traversing the BVH in a non-uniform traversal mode to determine the intersection, if any, between the given ray and one of the multiple geometric objects of the BVH, wherein the order of traversal of the nodes of the BVH is not synchronized between the multiple threads for the multiple rays, respectively, in the non-uniform traversal mode.

13. A computer system comprising multiple processing units and memory, wherein the computer system implements a ray tracing tool configured to perform operations for ray tracing multiple rays in parallel in a computer-represented environment that includes multiple geometric objects enclosed in a bounding volume hierarchy ("BVH"), the operations comprising:
receiving parameters for the multiple rays, the parameters for the multiple rays including one or more parameters for a given ray among the multiple rays;
in a uniform traversal mode, traversing the BVH to determine intersections, if any, between the multiple rays, respectively, and one or more of the multiple geometric objects of the BVH, wherein order of traversal of nodes of the BVH is synchronized between multiple threads, of one of the multiple processing units, for the multiple rays, respectively; and
after a threshold period of time or threshold number of iterations of the traversing the BVH in the uniform traversal mode, traversing the BVH in a non-uniform traversal mode to determine the intersections, if any, between at least some of the multiple rays, respectively, and one or more of the multiple geometric objects of the BVH, wherein the order of traversal of the nodes of the BVH is not synchronized between the multiple threads for the at least some of the multiple rays, respectively, in the non-uniform traversal mode.

14. The computer system of claim 13, wherein the traversing in the uniform traversal mode includes, for a different ray for each of the multiple threads as the given ray, in each of multiple iterations:
loading a bounding volume for a given node among the nodes of the BVH;
for the given ray, testing the bounding volume for the given node; and
determining whether to continue the traversing within the bounding volume for the given node and, if so:
determining whether the given node is a leaf node;
if the given node is a leaf node, testing whether the given ray intersects those of the multiple geometric objects that are in the bounding volume for the given node; and
if the given node is not a leaf node, scheduling multiple child nodes of the given node for subsequent traversal, as the given node, in later ones of the multiple iterations.

15. The computer system of claim 14, wherein the testing the bounding volume for the given node includes checking whether the bounding volume for the given node may include any new intersection closer than a leading intersection for the given ray.

16. The computer system of claim 13, wherein the traversing in the uniform traversal mode uses a cross-group operation in order to synchronize the traversal of the BVH between the multiple threads for the multiple rays, respectively, wherein the cross-group operation is a ballot operation, and wherein each of the multiple threads provides one vote in the ballot operation.

17. The computer system of claim 16, wherein the traversing in the uniform traversal mode includes determining, based on results of the cross-group operation, whether a bounding volume may include, for any of the multiple rays, any new intersection closer than a leading intersection for that ray.

18. The computer system of claim 16, wherein the traversing in the uniform traversal mode includes determining, based on results of the cross-group operation, whether a bounding volume may include, for at least a threshold number of the multiple rays, any new intersection closer than a leading intersection for the multiple rays, respectively.

19. The computer system of claim 13, wherein the operations further comprise:
for each of one or more dimensions of the computer-represented environment, determining ray direction sign information; and
as part of the traversing in the uniform traversal mode, using the ray direction sign information to prioritize the nodes in the BVH.

20. The computer system of claim 13, wherein:
the one or more parameters for the given ray include (a) an origin of the given ray, (b) a direction of the given ray, (c) a distance to a leading intersection, (d) an inverse direction of the given ray, and/or (e) the origin of the given ray times the inverse direction of the given ray; and
after the traversing in the uniform traversal mode, one or more parameters represent an intersection, if any, between the given ray and an intersected geometric object of the BVH, the one or more parameters that represent the intersection, if any, including (a) an identifier of the intersected geometric object, (b) coordinates of the intersection within the intersected geometric object, and/or (c) a distance to the intersection.

21. The computer system of claim 13, wherein the multiple geometric objects are triangles.

22. The computer system of claim 13, wherein the traversing in the uniform traversal mode uses stack push operations and stack pop operations on a shared stack to track position within the BVH, and wherein the shared stack is maintained in memory accessible to the multiple threads.

23. The computer system of claim 13, wherein the multiple processing units are single-instruction, multiple data ("SIMD") units of a graphics processing unit, and wherein the multiple threads are elements of one of the SIMD units.

24. The computer system of claim 13, wherein the multiple threads include n threads that, collectively, determine intersections, in any, for a group of n rays as the multiple rays.

25. One or more computer-readable media storing computer-executable instructions for causing a computer system having multiple processing units, when programmed thereby, to perform operations for ray tracing multiple rays in parallel in a computer-represented environment that includes multiple geometric objects enclosed in a bounding volume hierarchy ("BVH"), the operations comprising:
   estimating coherence of the multiple rays;
   with multiple threads of one of the multiple processing units, receiving parameters for the multiple rays, the parameters for the multiple rays including one or more parameters for a given ray among the multiple rays;
   determining whether the estimated coherence of the multiple rays satisfies a threshold;
   if so, with the multiple threads, traversing the BVH in a uniform traversal mode to determine intersections, if any, between the multiple rays, respectively, and one or more of the multiple geometric objects of the BVH; and
   otherwise, with the multiple threads, traversing the BVH in a non-uniform traversal mode to determine the intersections, if any, between the multiple rays, respectively, and the one or more of the multiple geometric objects of the BVH.

26. The one or more computer-readable media of claim 25, wherein the traversing the BVH in the uniform traversal mode uses a cross-group operation in order to synchronize the traversal of the BVH in the uniform traversal mode between the multiple threads for the multiple rays, respectively, wherein the cross-group operation is a ballot operation, and wherein each of the multiple threads provides one vote in the ballot operation.

27. The one or more computer-readable media of claim 26, wherein the traversing the BVH in the uniform traversal mode includes determining, based on results of the cross-group operation, whether a bounding volume may include, for any of the multiple rays, any new intersection closer than a leading intersection for that ray.

28. The one or more computer-readable media of claim 26, wherein the traversing the BVH in the uniform traversal mode includes determining, based on results of the cross-group operation, whether a bounding volume may include, for at least a threshold number of the multiple rays, any new intersection closer than a leading intersection for the multiple rays, respectively.

29. The one or more computer-readable media of claim 26, wherein the operations further comprise:
   for each of one or more dimensions of the computer-represented environment, determining ray direction sign information; and
   as part of the traversing the BVH in the uniform traversal mode, using the ray direction sign information to prioritize the nodes in the BVH.

\* \* \* \* \*